US012494067B2

(12) United States Patent
Kim

(10) Patent No.: US 12,494,067 B2
(45) Date of Patent: Dec. 9, 2025

(54) ELECTRONIC DEVICE FOR DETECTING REAR SURFACE OF TARGET VEHICLE AND OPERATING METHOD THEREOF

(71) Applicant: THINKWARE CORPORATION, Seongnam-si (KR)

(72) Inventor: Shinhyoung Kim, Seongnam-si (KR)

(73) Assignee: THINKWARE CORPORATION, Seongnam-si (KR)

( * ) Notice: Subject to any disclaimer, the term of this patent is extended or adjusted under 35 U.S.C. 154(b) by 408 days.

(21) Appl. No.: 18/089,712

(22) Filed: Dec. 28, 2022

(65) Prior Publication Data
US 2023/0206649 A1 Jun. 29, 2023

(30) Foreign Application Priority Data

Dec. 29, 2021 (KR) ........................ 10-2021-0191433

(51) Int. Cl.
*G06V 20/58* (2022.01)
*B60W 30/09* (2012.01)
(Continued)

(52) U.S. Cl.
CPC ............ *G06V 20/58* (2022.01); *B60W 30/09* (2013.01); *B60W 30/0953* (2013.01);
(Continued)

(58) Field of Classification Search
CPC .... G06V 20/58; G06V 10/25; G06V 2201/07; G06V 2201/08; G06V 10/82;
(Continued)

(56) References Cited

U.S. PATENT DOCUMENTS

2020/0039517 A1\* 2/2020 Berkemeier .... B60W 30/18036
2020/0216075 A1\* 7/2020 Park ..................... G06V 10/764
(Continued)

OTHER PUBLICATIONS

Liu et al., "Rear Vehicle Detection and Tracking for Lane Change Assist", Proceedings of the 2007 IEEE Intelligent Vehicles Symposium, Jun. 1, 2007, pp. 252-257. (6 pages) (Year: 2007).*
(Continued)

*Primary Examiner* — Anand P Bhatnagar
*Assistant Examiner* — Rachel Anne Ometz
(74) *Attorney, Agent, or Firm* — WHDA, LLP

(57) ABSTRACT

An electronic device provided in an autonomous vehicle, the electronic device comprising a camera, a memory storing at least one instruction, and at least one processor operatively coupled with the camera, wherein the at least one processor is configured to, when the at least one instruction is executed obtain a front image in which the autonomous vehicle is driving through the camera, identify a target vehicle in the front image based on the vehicle detection model stored in the memory, generate a bounding box corresponding to the target vehicle in response to an identification of the target vehicle, generate a sliding window having a height equal to the height of the bounding box and having a width half of the width of the bounding box, divide the bounding box into a first area positioned left based on a middle position of the width of the sliding window and a second area positioned right based on the middle position, generate an extended bounding box by extending the first area in a left direction and extending the second area in a right direction, wherein size of the extended bounding box is twice as wide as size of the bounding box, obtain a sum of a pixel difference values between the first area and the second area for each shift by sequentially shifting the sliding window by a predefined pixel interval with respect to all of width of the extended bounding box, and identify a point that corre-
(Continued)

sponds to a minimum value among sum values respectively indicating the sums that are obtained according to the shifting.

20 Claims, 22 Drawing Sheets

(51) Int. Cl.
*B60W 30/095* (2012.01)
*B60W 60/00* (2020.01)
*G06T 7/60* (2017.01)
*G06V 10/25* (2022.01)

(52) U.S. Cl.
CPC .... *B60W 30/0956* (2013.01); *B60W 60/0015* (2020.02); *G06T 7/60* (2013.01); *G06V 10/25* (2022.01); *B60W 2420/403* (2013.01); *B60W 2520/00* (2013.01); *B60W 2554/404* (2020.02); *B60W 2554/80* (2020.02); *G06T 2207/30252* (2013.01); *G06V 2201/07* (2022.01); *G06V 2201/08* (2022.01)

(58) Field of Classification Search
CPC ............. B60W 30/09; B60W 30/0953; B60W 30/0956; B60W 60/0015; B60W 2420/403; B60W 2520/00; B60W 2554/404; B60W 2554/80; B60W 40/04; B60W 60/001; B60W 60/0016; B60W 30/08; B60W 40/02; B60W 40/105; B60W 2050/0005; B60W 2050/143; B60W 2520/10; B60W 2554/802; G06T 7/60; G06T 2207/30252; B60J 1/16
See application file for complete search history.

(56) References Cited

U.S. PATENT DOCUMENTS

| | | | |
|---|---|---|---|
| 2020/0218913 A1* | 7/2020 | Unnikrishnan | G01S 13/867 |
| 2021/0042955 A1* | 2/2021 | Lee | G06V 20/588 |
| 2021/0094577 A1* | 4/2021 | Shalev-Shwartz | B60W 30/0953 |
| 2021/0110173 A1* | 4/2021 | Serafin | G06T 7/251 |
| 2022/0237583 A1* | 7/2022 | Bandi | G07F 17/0014 |
| 2024/0078903 A1* | 3/2024 | Park | H04L 63/0442 |

OTHER PUBLICATIONS

Liu et al., "Rear Vehicle Detection and Tracking for Lane Change Assist", Proceedings of the 2007 IEEE Intelligent Vehicles Symposium, Jun. 1, 2007, pp. 252-257. (6 pages).

Regensburger et al., "Visual recognition of obstacles on roads", Intelligent Robots and Systems '94. 'Advanced Robotic Systems and the Real World', IROS '94. Proceedings of the IEEE/RSJ/GI International Conference on Munich, Germany Sep. 12-16, 1994, vol. 2, Jan. 1, 1994, pp. 980-987. (14 pages).

Teoh et al., "Symmetry-based monocular vehicle detection system", Machine Vision and Applications, Springer, Berlin, DE, vol. 23, No. 5, Jul. 8, 2011, pp. 831-842. (12 pages).

Andreas Kuehnle, "Symmetry-based vehicle location for AHS", Transportation Sensors and Controls: Collision Avoidance, Traffic Management, and Its: Nov. 18-20, 1996, Boston, Massachusetts, Spie, the International Society for Optical Engineering, Bellingham, Wash, vol. 2902, Jan. 1, 1997, pp. 19-27. (9 pages).

Nishigaki et al., "Vision-based Lateral Position Improvement of RADAR Detections", Intelligent Transportation Systems (ITSC), 2012 15th International IEEE Conference on Intelligent Transportation Systems, IEEE, Sep. 16, 2012, pp. 90-97. (8 pages).

Extended European Search Report dated Apr. 28, 2023, issued in counterpart EP Application No. 22216974.0. (16 pages).

* cited by examiner

ELECTRONIC DEVICE FOR DETECTING REAR SURFACE OF TARGET VEHICLE AND OPERATING METHOD THEREOF

CROSS-REFERENCE TO RELATED APPLICATION(S)

This application is based on and claims priority under 35 U.S.C. § 119 to Korean Patent Application No. 10-2021-0191433, filed on Dec. 29, 2021, in the Korean Intellectual Property Office, the disclosure of which is incorporated by reference herein their entirety.

BACKGROUND

Technical Field

Following descriptions relate to an electronic device for detecting a rear surface of a target vehicle and an operating method thereof.

Description of Related Art

Autonomous driving means driving a vehicle without a user input of a driver or a passenger. Such autonomous driving may be classified into levels in which the driver or the passenger monitors the driving environment and levels in which an autonomous driving system related to the vehicle monitors the driving environment. For example, the levels in which a driver or passenger monitors the driving environment includes Level 1 (drive assistance level) corresponding to a stage in which a steering assistance system or an acceleration/deceleration assistance system is executed in the vehicle, but the driver performs all functions related to the dynamic driving of the vehicle, and Level 2 (partial automation level) in which the steering assistance system or the acceleration/deceleration assistance system is executed in the vehicle, but monitoring of the driving environment is performed by the driver's operation. For example, the levels in which the autonomous driving system related to the vehicle monitors the driving environment includes Level 3 (conditional automation level) in which the autonomous driving system controls all aspects of operation related to driving, but the driver must control the vehicle when the autonomous driving system requests the driver's intervention, Level 4 (high automation level) in which the autonomous driving system related to the vehicle performs all of the key control of driving, monitoring of the driving environment, response in case of an emergency, and the like, but requires partial intervention by the driver, and Level 5 (full automation) in which the autonomous driving system related to the vehicle always perform driving in all road conditions and environments.

SUMMARY

A vehicle capable of autonomous driving may identify a surrounding state based on a front image obtained through a camera. For example, in case of FCWS (forward collision warning system), a vehicle positioned in front of a driving lane of an ego vehicle is detected, and a collision time is calculated using the distance to the vehicle and the velocity of the ego vehicle, and notification is provided to the user. However, in case of a vehicle driving in a neighboring lane, it is difficult to calculate the exact full width because a vehicle area detected through the front image includes a side surface of the vehicle, and accordingly, there is a problem in that the calculation of the distance to the vehicle driving in the neighboring lane is inaccurate.

The technical problems to be achieved in this document are not limited to those described above, and other technical problems not mentioned herein will be clearly understood by those having ordinary knowledge in the art to which the present disclosure belongs, from the following description.

An electronic device provided in an autonomous vehicle according to an embodiment may comprise a camera; a memory storing at least one instruction; and at least one processor operatively coupled with the camera; wherein the at least one processor may be configured to, when the instructions are executed, obtain a front image in which the autonomous vehicle is driving through the camera, identify a target vehicle in the front image based on the vehicle detection model stored in the memory, generate a bounding box corresponding to the target vehicle in response to an identification of the target vehicle, generate a sliding window having a height equal to the height of the bounding box and having a width half of the width of the bounding box, divide the left area into the first area based on the middle position of the width of the sliding window and the right area into the second area based on the middle position, generate an extended bound box by expanding the same size as the first area to the left of the bounding box and expanding the same size as the second area to the right of the bounding box, obtain a sum of a pixel difference values between the first area and the second area for each shift by sequentially shifting the sliding window by a predefined pixel interval with respect to all of width of the extended bounding box, and identify the point at which the sum value is the minimum among the obtained sums.

A method of operating an electronic device provided in an autonomous vehicle according to an embodiment may comprise obtaining a front image in which the autonomous vehicle is driving, identifying a target vehicle in the front image based on the vehicle detection model, generating a bounding box corresponding to the target vehicle in response to an identification of the target vehicle, generating a sliding window having a height equal to the height of the bounding box and having a width half of the width of the bounding box, dividing the left area into the first area based on the middle position of the width of the sliding window and the right area into the second area based on the middle position, generating an extended bound box by expanding the same size as the first area to the left of the bounding box and expanding the same size as the second area to the right of the bounding box, obtaining a sum of a pixel difference values between the first area and the second area for each shift by sequentially shifting the sliding window by a predefined pixel interval with respect to all of width of the extended bounding box, and identifying the point at which the sum value is the minimum among the obtained sums.

The effects that can be obtained from the present disclosure are not limited to those described above, and any other effects not mentioned herein will be clearly understood by those having ordinary knowledge in the art to which the present disclosure belongs, from the following description.

DETAILED DESCRIPTION

According to an electronic device for detecting a rear surface of a target vehicle and an operating method thereof according to an embodiment, by improving the accuracy of detecting the full width of the rear surface of the target vehicle driving in a neighboring lane of the ego vehicle, the accuracy of calculating the distance to the target vehicle can be improved, thereby providing an autonomous vehicle with improved safety.

Figure 1:
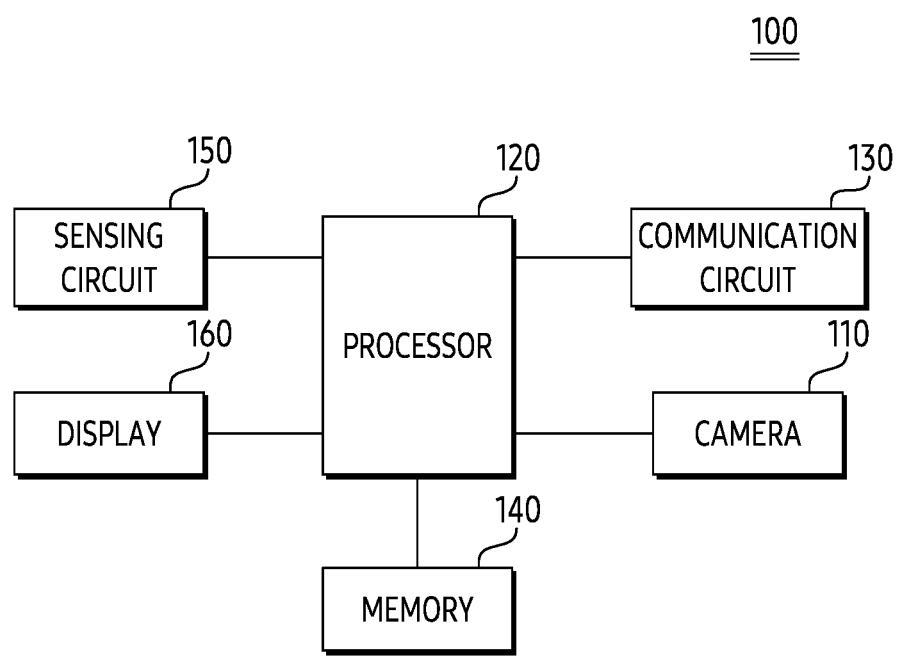
FIG. 1 is a simplified block diagram of an electronic device according to various embodiments.

FIG. 1 is a simplified block diagram of an electronic device 100 according to various embodiments.

Referring to FIG. 1, the electronic device 100 may include a camera 110, a processor 120, a communication circuit 130, a memory 140, a sensing circuit 150, and/or a display 160.

According to an embodiment, the electronic device 100 may be embedded in an autonomous vehicle. For example, the autonomous vehicle may be stationary or moving. In the following specification, for convenience of explanation, the electronic device 100 included in the vehicle may be described as a form of vehicle.

According to an embodiment, the processor 120 may control the overall operation of the electronic device 100. The processor 120 may execute applications that provide an advertisement service, an Internet service, a game service, a multimedia service, and/or a navigation (or map) service, and the like. In various embodiments, the processor 120 may include a single processor core or may include a plurality of processor cores. For example, the processor 120 may include multi-cores such as dual-core, quad-core, hexa-core, and the like. According to an embodiment, the processor 120 may further include a cache memory positioned inside or outside. The processor 120 may receive instructions of other components of the electronic device 100, interpret the received instructions, and perform calculations or process data according to the interpreted instructions. The processor 120 may process data or signals generated or occurred in the application. For example, the processor 120 may request a instruction, data, or signal from the memory 140 to execute or control the application. The processor 120 may record (or store) or update the instruction, data, or signal in the memory 140 to execute or control the application. The processor 120 may interpret and process a message, data, instruction, or signal received from the communication circuit 130, the camera 110, the sensing circuit 150, the memory 140, or the display 160. For example, the processor 120 may generate a new message, data, instruction, or signal based on the received message, data, instruction, or signal. The processor 120 may provide the processed or generated message, data, instruction, or signal to the communication circuit 130, the camera 110, the sensing circuit 150, the memory 140, or the display 160. According to an embodiment, all or part of the processor 120 may be electrically or operably coupled with or connected to other components (e.g., communication circuit 130, camera 110, sensing circuit 150, memory 140, or display 160) in the electronic device 100. According to an embodiment, the processor 120 may be configured with one or more processors. For example, the processor 120 may include AP (application processor) controlling upper layer programs such as application programs and the like, GPU (graphics processing unit) for configuring the screen displayed on the display 160 and controlling the screen, image signal processor for controlling the camera 110, sensor hub for controlling the sensing circuit 150, or CP (communication processor) for controlling the communication circuit 130, and the like. Additionally, the processor 120 may include a hardware structure specialized for processing an artificial intelligence model. The artificial intelligence model may be generated through machine learning. Such learning may be performed, for example, in the electronic device 100 itself in which the artificial intelligence model is performed, or may be performed through a separate server. The learning algorithm may include, for example, supervised learning, unsupervised learning, semi-supervised learning, or reinforcement learning, but is not limited to the above-described examples.

The artificial intelligence model may include a plurality of artificial neural network layers. The artificial neural network may be one of DNN (deep neural network), CNN (convolutional neural network), RNN(recurrent neural network), RBM(restricted boltzmann machine), DBN(deep belief network), BRDNN(bidirectional recurrent deep neural network), deep Q-networks, or a combination of two or more thereof, but is not limited to the above-described example. In addition to the hardware structure, the artificial intelligence model may include a software structure, additionally or alternatively.

According to an embodiment, the communication circuit 130 may be used to generate a communication path between another electronic device (e.g., a server, an external electronic device, or a device embedded in a vehicle) and the electronic device 100. For example, the communication circuit 130 may support a designated protocol capable of connecting with the other electronic device in a wired or wireless manner. For example, the communication circuit 130 may include HDMI (high-definition multimedia interface), a USB (universal serial bus) interface, an SD card interface, and an audio interface in association with connection terminals such as HDMI connector, USB connector, an SD card connector, or an audio connector (e.g., a headphone connector). For another example, the communication circuit 130 may include a module (or circuit) for at least one of a Bluetooth communication technique, a BLE (Bluetooth low energy) communication technique, a Wi-Fi (wireless fidelity) communication technique, a cellular or mobile communication technique, or a wired communication technique. The communication circuit 130 may include a GPS (global positioning system) communication circuit (or a GNSS communication circuit). The communication circuit 130 may transmit and receive a GPS signal. The GPS may include at least one of GLONASS (global navigation satellite system), Beidou Navigation Satellite System (hereinafter referred to as "Beidou"), QZSS(quasi-zenith satellite system), IRNSS(Indian reginal satellite system) or Galileo (the European global satellite-based navigation system) depending on an area of use or bandwidth. The communication circuit 130 may provide information or data received through the communication path from the other electronic device to the processor 120. The communication circuit 130 may transmit information or data provided from the processor 120 to the other electronic device through the communication path.

According to an embodiment, the camera 110 may photograph a still image or a video of the front of the electronic device 100. In various embodiments, the camera 110 may include at least one of one or more lenses (e.g., a lens assembly), an image sensor, a flash, an image stabilizer, or a buffer memory. According to an embodiment, the camera 110 may include a plurality of lens assemblies. For example, the plurality of lens assemblies may have the same lens properties (e.g., angle of view, focal distance, auto focus, f number, or optical zoom). For example, at least one of the plurality of lens assemblies may have a lens property distinct from at least the other one of the plurality of lens assemblies. For example, at least one of the plurality of lens assemblies may be configured for a wide-angle lens, and at least the other one of the plurality of lens assemblies may be configured for a telephoto lens. In various embodiments, the image sensor may obtain an image corresponding to the subject (e.g., an image related to a vehicle including the electronic device 100) by converting light transmitted from the subject through the one or more lenses into an electrical signal. In an embodiment, the image sensor may include one image sensor selected from image sensors having different property, such as an RGB sensor, a BW (black and white) sensor, an IR sensor, or a UV sensor, a plurality of image sensors having the same property, or a plurality of image sensors having different property. Each image sensor included in the image sensor may be implemented as, for example, a CCD (charged coupled device) sensor or a CMOS (complementary metal oxide semiconductor) sensor.

In various embodiments, in response to the movement of camera 110 or electronic device 100, the image stabilizer may move or control the one or more lenses or the image sensor in a specific direction (e.g., adjust the read-out timing, and the like) in order to at least partially compensate for a negative effect (e.g., image shaking) caused by the movement on an image which is being captured. In an embodiment, the image stabilizer may be implemented as an optical image stabilizer, and the movement may be detected using a gyro sensor (e.g., sensing circuit 150) or an acceleration sensor (e.g., sensing circuit 150) disposed inside or outside the electronic device 100 or camera 110.

In various embodiments, the buffer memory may store at least a portion of an image obtained through the image sensor at least temporarily for a next image processing operation. For example, in case that obtaining of image is delayed according to the shutter or high-speed obtaining of a plurality of images is executed, the obtained original image (e.g., high-resolution image) may be stored in the buffer memory, and a copy image (e.g., low-resolution image) corresponding to the original image may be previewed through the display 160. When a specified condition is satisfied after the preview (e.g., a user input or a system command), at least a portion of the original image stored in the buffer memory may be obtained and processed by the image signal processor. In an embodiment, the buffer memory may be configured as at least a portion of the memory 140, or may be configured as a separate memory operating independently from the memory 140. The memory 140 may store an instruction, a control command code, control data, or user data for controlling the electronic device 100. For example, memory 140 may include an application, an OS (operating system), middleware, and/or a device driver.

The memory 140 may include one or more of a volatile memory or a non-volatile memory. The volatile memory may include a DRAM (dynamic random-access memory), a SRAM (static RAM), a SDRAM (synchronous DRAM), a PRAM (phase-change RAM), a MRAM (magnetic RAM), a RRAM (resistive RAM), a FeRAM (ferroelectric RAM), and the like. The nonvolatile memory may include a ROM (read only memory), a PROM (programmable ROM), a EPROM (electrically programmable ROM), a EEPROM (electrically erasable programmable ROM), a flash memory, and the like. The memory 140 may include a non-volatile medium such as a HDD (hard disk drive), a SSD (solid state disk), a eMMC(embedded multi-media card), and a UFS (universal flash storage).

According to an embodiment, the sensing circuit 150 may generate an electrical signal or data value corresponding to an internal operating state (e.g., power or temperature) of the electronic device 100 or an external environmental state of the electronic device 100. For example, the sensing circuit 150 may include a radar sensor, a lidar sensor, a gesture sensor, a gyro sensor, a barometric pressure sensor, a magnetic sensor, an acceleration sensor, a velocity sensor (or a speedometer), a grip sensor, a proximity sensor, a color sensor, an IR (infrared) sensor, a biometric sensor, a temperature sensor, a humidity sensor, or an illuminance sensor.

In various embodiments, the sensing circuit 150 may include a transmitter configured to emit a signal (or pulse) and a receiver configured to receive a reflected signal for the signal. For example, the sensing circuit 150 may emit a signal (e.g., light) and receive a reflected signal under the control of the processor 120. The sensing circuit 150 may identify the external environment of the electronic device 100 by analyzing the time until the reflected signal is received, the phase shift of the reflected signal, the pulse power of the reflected signal, and/or the pulse width of the reflected signal, and the like. For example, the external environment may correspond to the front of the electronic device 100. For example, the sensing circuit 150 may be used to obtain distance information from the electronic device 100 to an object by measuring the time from after when the signal is emitted by the transmitter to when the signal is reflected and received by the receiver. For example, the sensing circuit 150 may include a radar sensor and/or a lidar sensor.

According to an embodiment, the display 160 may output content, data, or a signal. In various embodiments, the display 160 may display an image signal processed by the processor 120. For example, the display 160 may display a captured or still image. For another example, the display 160 may display a video or a camera preview image. For another example, the display 160 may display a GUI (graphical user interface) so that the user may interact with the electronic device 100. The display 160 may be configured with an LCD (liquid crystal display) or an OLED (organic light emitting diode). According to an embodiment, the display 160 may be configured with an integral touch screen by being coupled with a sensor capable of receiving a touch input and the like. In various embodiments, at least one of the communication circuit 130, the camera 110, or the sensing circuit 150 may be disposed outside the electronic device 100.

Figure 2:
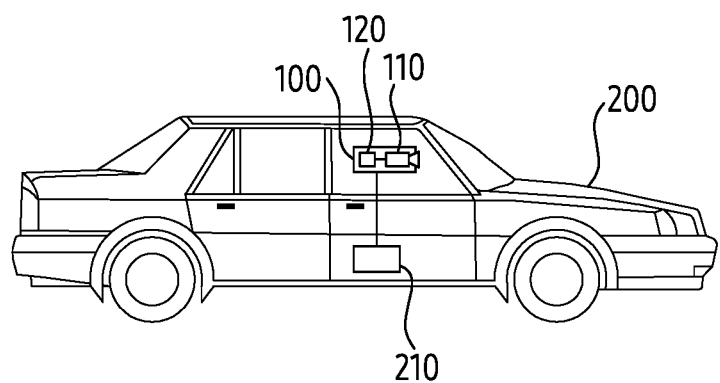
FIG. 2 is a side view of a host vehicle including an electronic device according to various embodiments.

FIG. 2 is a side view of a host vehicle including the electronic device 100 according to an embodiment of the present disclosure.

Referring to FIGS. 1 and 2, the host vehicle 200 may include the electronic device 100 and a vehicle control unit 210. The host vehicle 200 may refer to an autonomous vehicle equipped with the electronic device 100. For example, the host vehicle 200 may be referred to as various terms including an ego vehicle and a self-vehicle.

The vehicle control unit 210 may control overall driving of the host vehicle 200. For example, information indicating a straight-line distance received from the distance estimating device 100 may be received, and based on this information, the velocity of the host vehicle 200 may be controlled. The straight-line distance may refer to a distance between the target vehicle and the host vehicle 200.

The vehicle control unit 210 may identify that the straight-line distance to the target vehicle is less than or equal to the threshold distance. The vehicle control unit 210 may perform control to decrease the velocity of the host vehicle 200 in response to identifying a straight-line distance less than or equal to the threshold distance. To this end, the vehicle control unit 210 may generate a control signal instructing deceleration and transmit the control signal to the brake system.

Figure 3A:
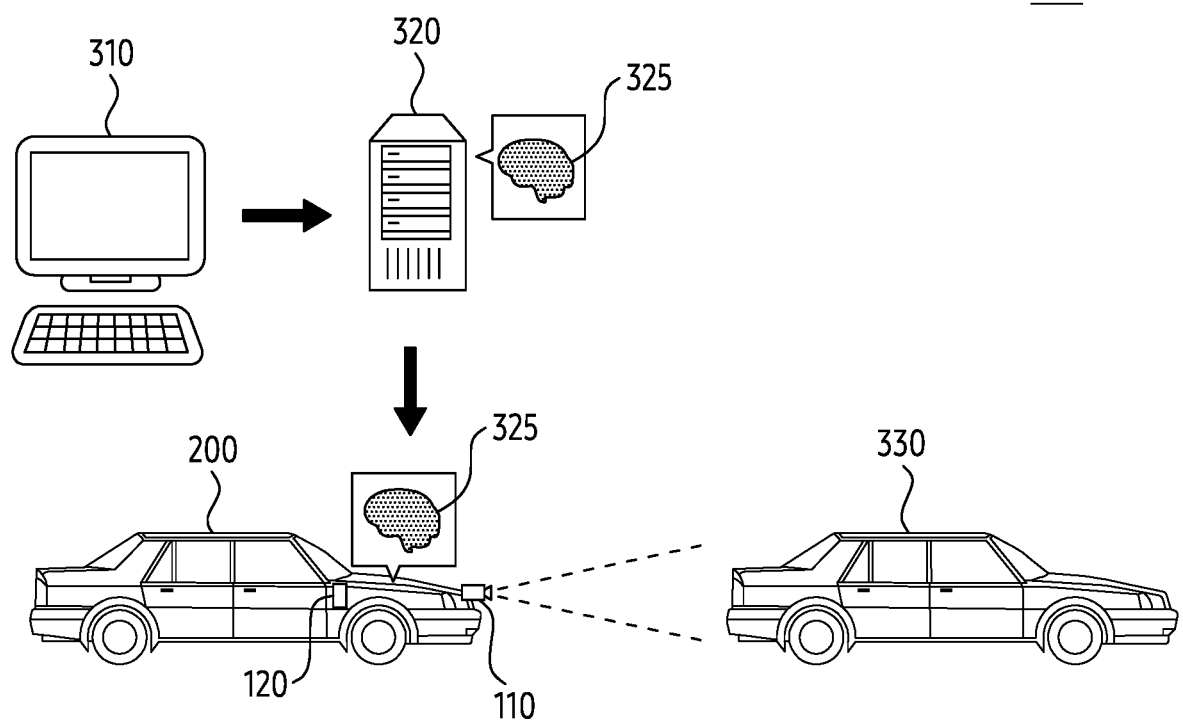
FIG. 3A illustrates an example of an environment including electronic devices according to various embodiments.

FIG. 3A illustrates an example of an environment 300 including electronic devices according to various embodiments.

Figure 3B:
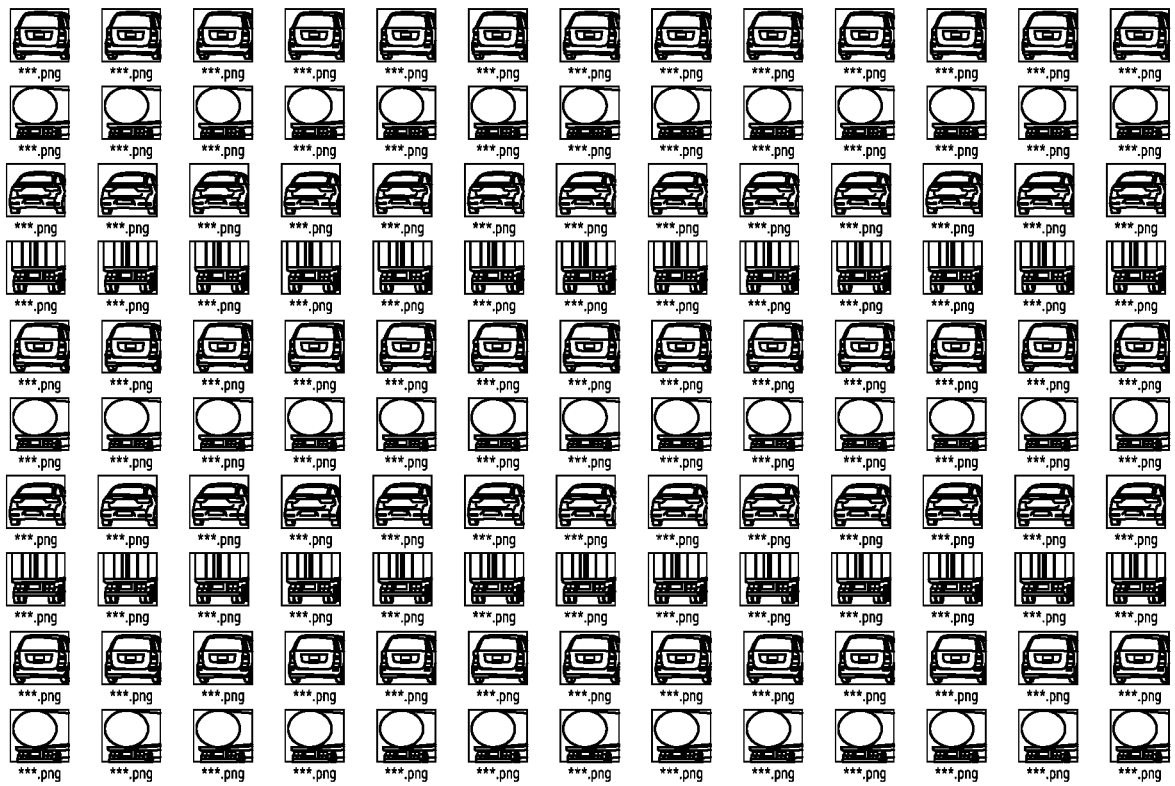
FIG. 3B illustrates an example of a training data set according to various embodiments.
Figure 3B:
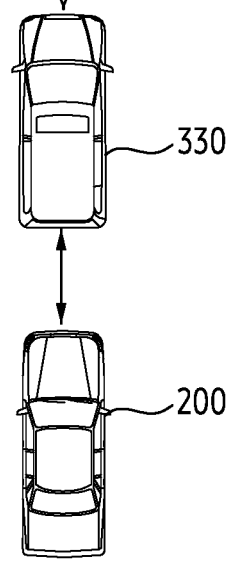

FIG. 3B illustrates an example of a training data set 315 according to various embodiments.

Referring to FIG. 3A, the environment 300 may include an electronic device 310, an electronic device 320, and an electronic device 100.

In various embodiments, the electronic device 310 may be used to obtain a data set 315 for vehicle detection model 325 trained by the electronic device 320. For example, the electronic device 310 may obtain an image including a visual object corresponding to the exterior of the vehicle. The electronic device 310 may obtain information about attributes about the visual object included in the obtained image or an area including the visual object, based on a user input. The electronic device 310 may provide the data set 315 to the electronic device 320. Referring to FIG. 3B, the data set 315 provided to the electronic device 320 may include a plurality of images about the front vehicle 330.

In various embodiments, the electronic device 320 may be used to train the vehicle detection model 325. For example, the electronic device 320 may obtain the data set 315 from the electronic device 310. The electronic device 320 may provide the data set 315 to the vehicle detection model 325. For example, the vehicle detection model 325 may be a model trained by the electronic device 320 to provide the electronic device 100 included in the host vehicle 200 with information on whether there is a visual object corresponding to the exterior of the vehicle in the image obtained through the camera 110 related to the host vehicle 200. For example, the vehicle detection model 325 may be stored in the electronic device 320 for the training. For another example, the vehicle detection model 325 may be communicatively connected to the electronic device 320 for the training.

The vehicle detection model 325 may obtain the data set 315 from the electronic device 320. The vehicle detection model 325 may perform training based on the data set 315. For example, the vehicle detection model 325 may perform training based on information about the image (or a portion of the image) in the data set and the attribute associated with the image (or a portion of the image) in the data set. While performing the training, the vehicle detection model 325 may extract feature points from the image (or a portion of the image) and may obtain relationship information between the extracted feature points and information about the attribute. For example, the extraction of the feature points may be performed based on grayscale intensity, RGB (red, green, blue) color information, HSV(hue, saturation, value) color information, YIQ color information, edge information (grayscale, binary, eroded binary), and the like.

In various embodiments, the vehicle detection model 325 may determine whether a visual object corresponding to the exterior of the vehicle is included in the image based on the relationship information. In case that the reliability of the determination reaches the reference reliability level or higher, the vehicle detection model 325 trained by the electronic device 320 may be related to the electronic device 100. For example, the vehicle detection model 325 trained by the electronic device 320 may be included in the electronic device 100. For another example, the vehicle detection model 325 trained by the electronic device 320 is a device distinct from the electronic device 320 and may be positioned in the host vehicle 200 and connected to the electronic device 100 by wireless or by wire. For another example, the vehicle detection model 325 trained by the electronic device 320 is a device distinct from the electronic device 320 and may be positioned outside the host vehicle 200 and connected to the electronic device 100 by wireless or by wire.

FIG. 3A illustrates an example in which the position of the camera 110 is positioned on the front surface of the vehicle, but this is for convenience of explanation. Depending on embodiments, the position of the camera 110 may be changed. For example, the camera 110 may be positioned on a dashboard or on a wind shied or on a room mirror of the vehicle. For another example, camera 110 may be positioned at an appropriate position on the rear of the vehicle.

Figure 4:
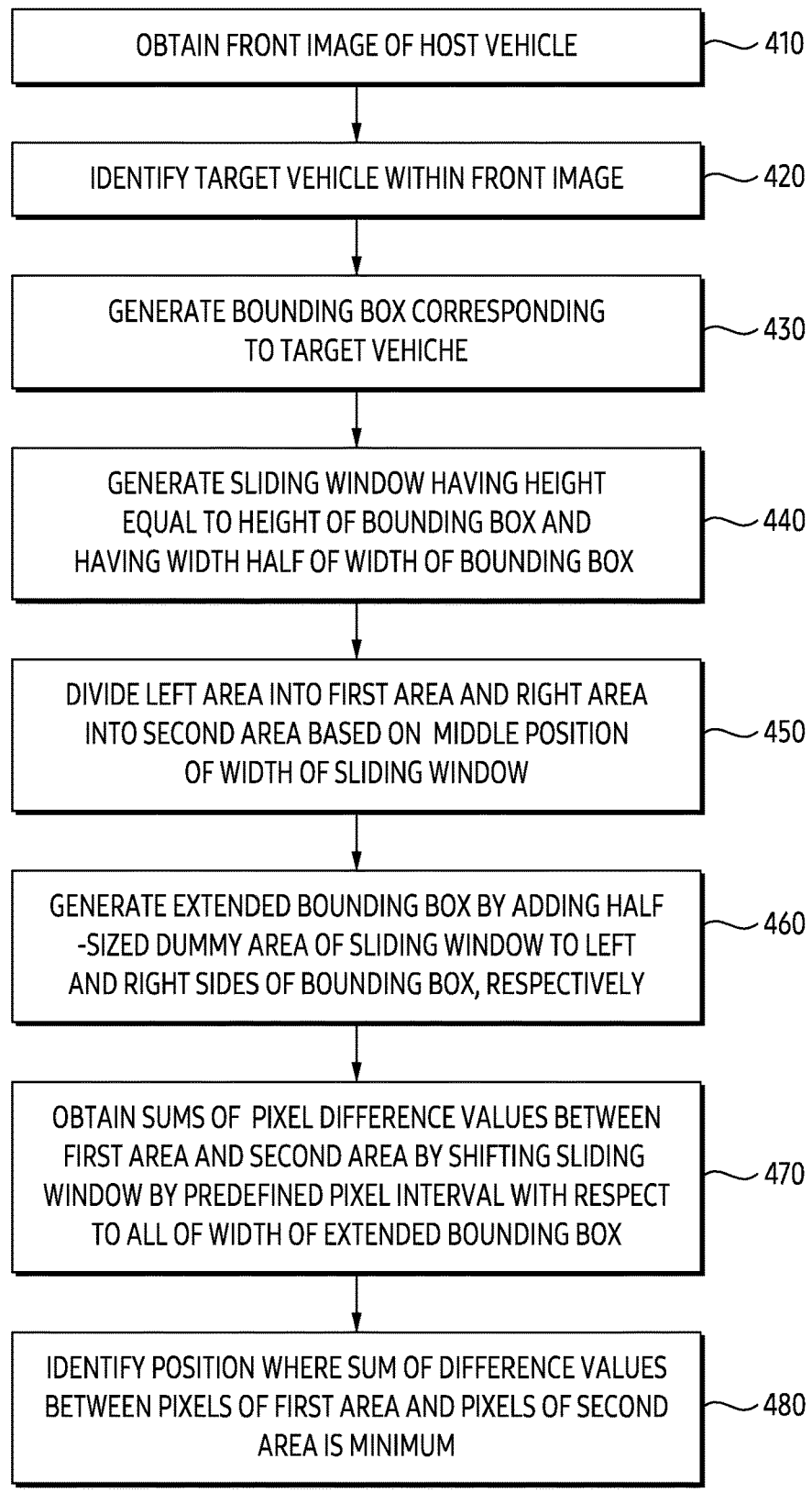
FIG. 4 is a flowchart illustrating an operating method of an electronic device according to various embodiments.

FIG. 4 is a flowchart illustrating an operating method of an electronic device 100 according to various embodiments.

Figure 5A:
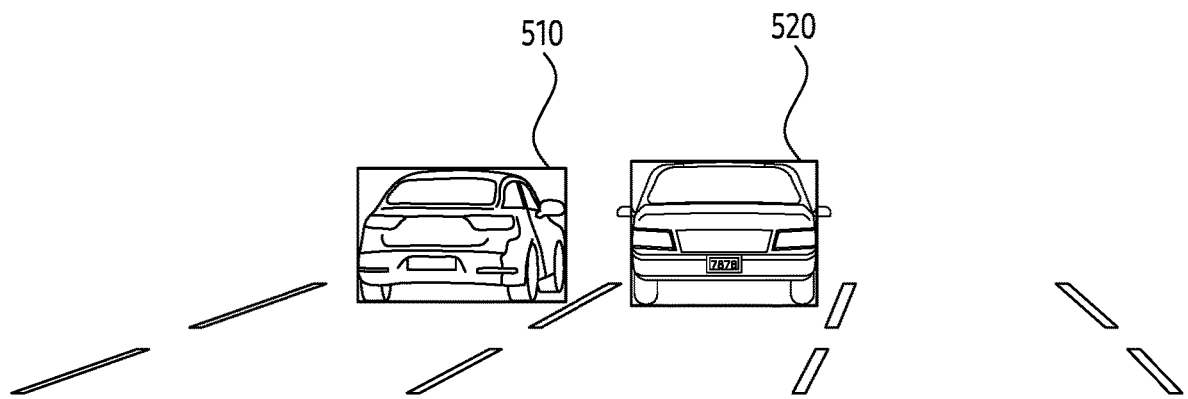
FIG. 5A illustrates an example of a front image and a bounding box obtained through a camera according to various embodiments.

FIG. 5A illustrates an example of a front image and a bounding box obtained through a camera 110 according to various embodiments.

Figure 5B:
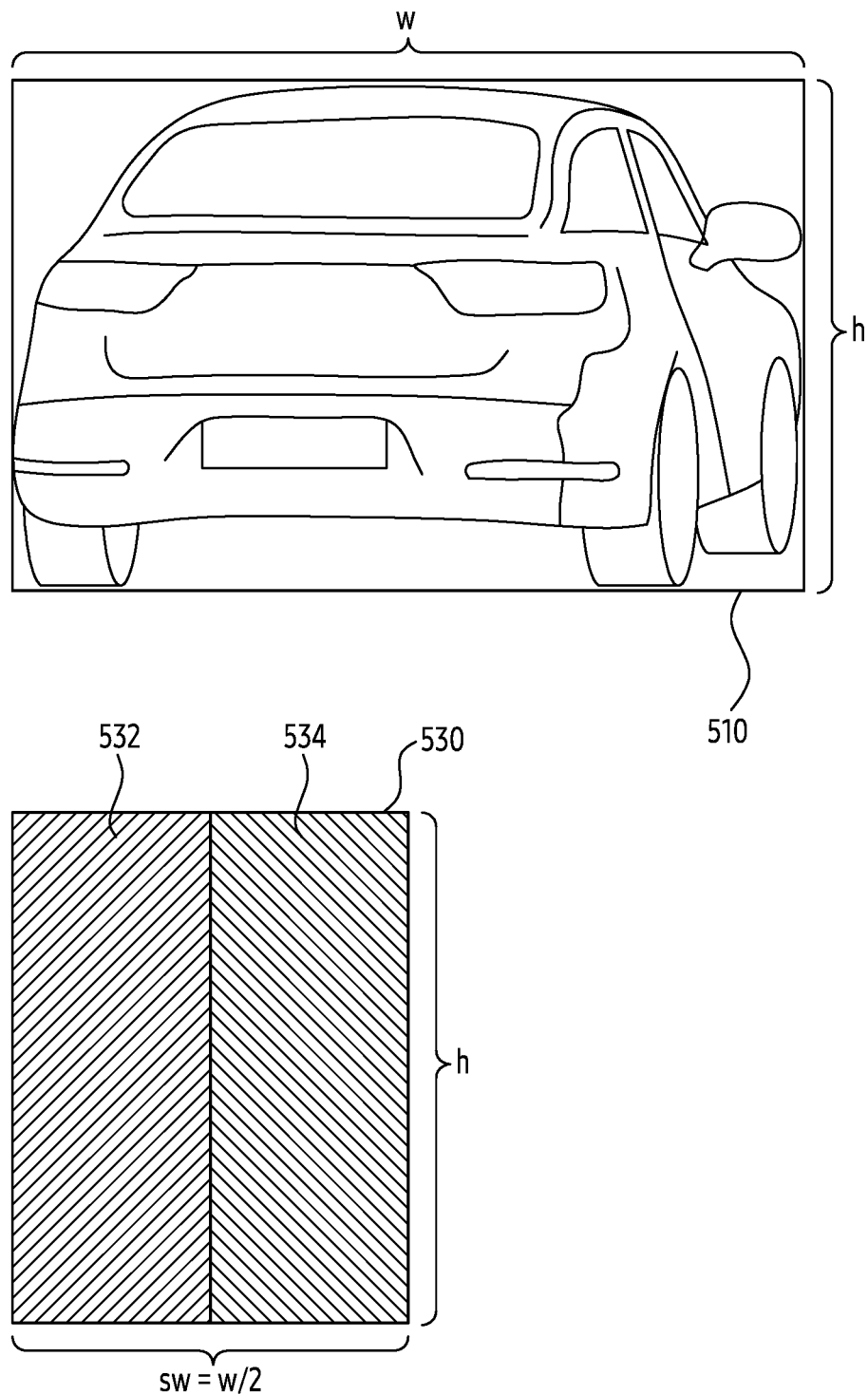
FIG. 5B illustrates a bounding box and a sliding window according to various embodiments.

FIG. 5B illustrates a bounding box 510 and a sliding window 530 according to various embodiments.

Figure 5C:
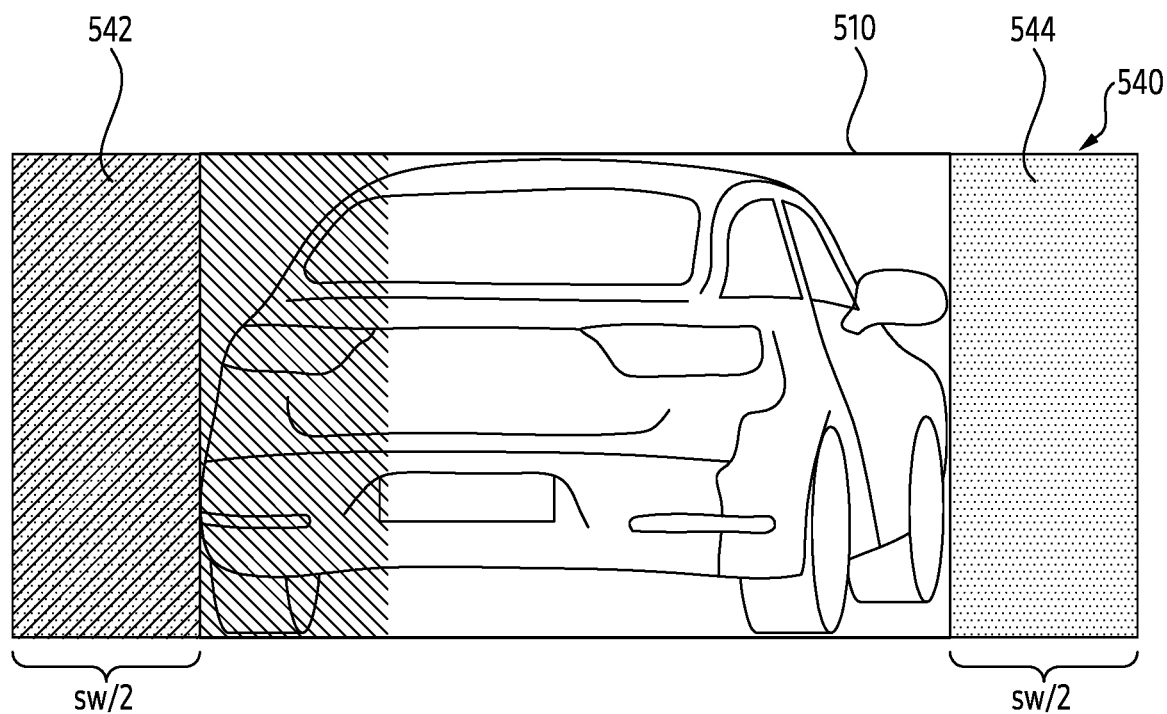
FIG. 5C illustrates an extended bounding box according to various embodiments.

FIG. 5C illustrates an extended bounding box 540 according to various embodiments.

Figure 5D:
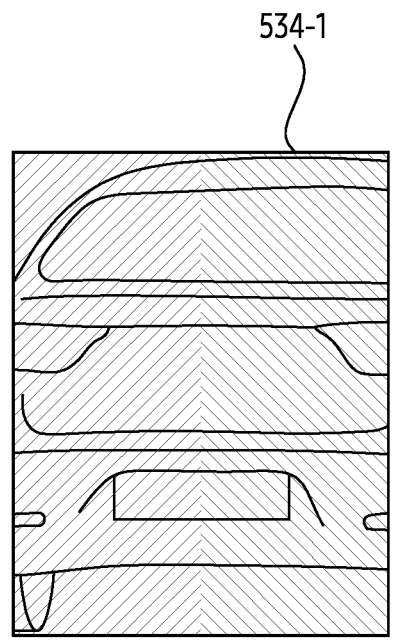
FIG. 5D illustrates an example of inverting a second area of a sliding window left and right according to various embodiments.
Figure 5D:
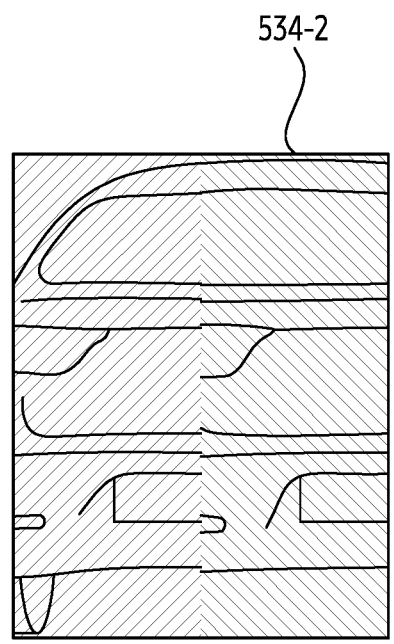

FIG. 5D illustrates an example of inverting a second area of a sliding window 530 left and right according to various embodiments.

Figure 5E:
FIG. 5E illustrates an example of calculating a pixel difference value according to various embodiments.
Figure 5E:
Figure 5E:
Figure 5E:

FIG. 5E illustrates an example of calculating a pixel difference value according to various embodiments.

Figure 5F:
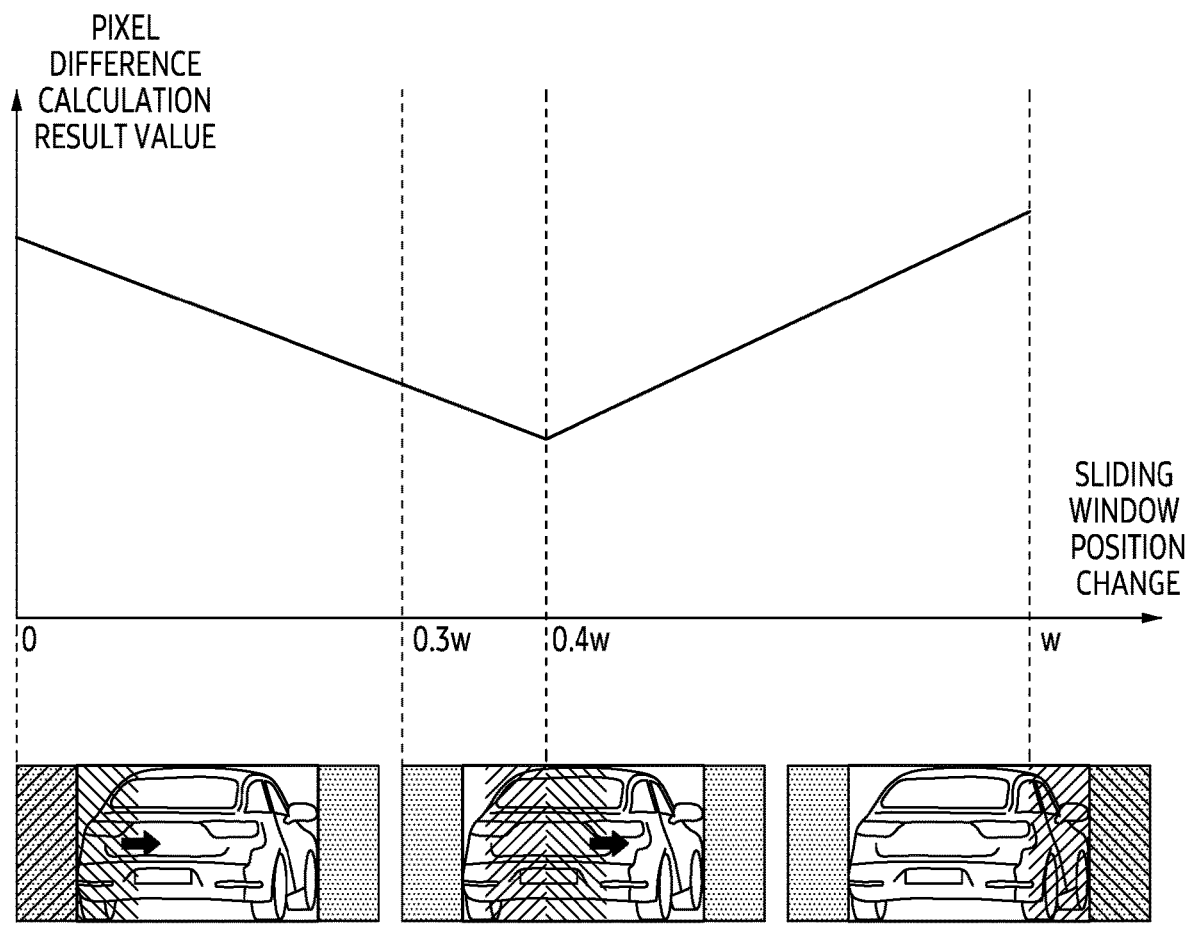
FIG. 5F illustrates a graph illustrating a pixel difference value according to a position change of a sliding window according to various embodiments.

FIG. 5F illustrates a graph illustrating a pixel difference value according to a position change of a sliding window 530 according to various embodiments.

Figure 5G:
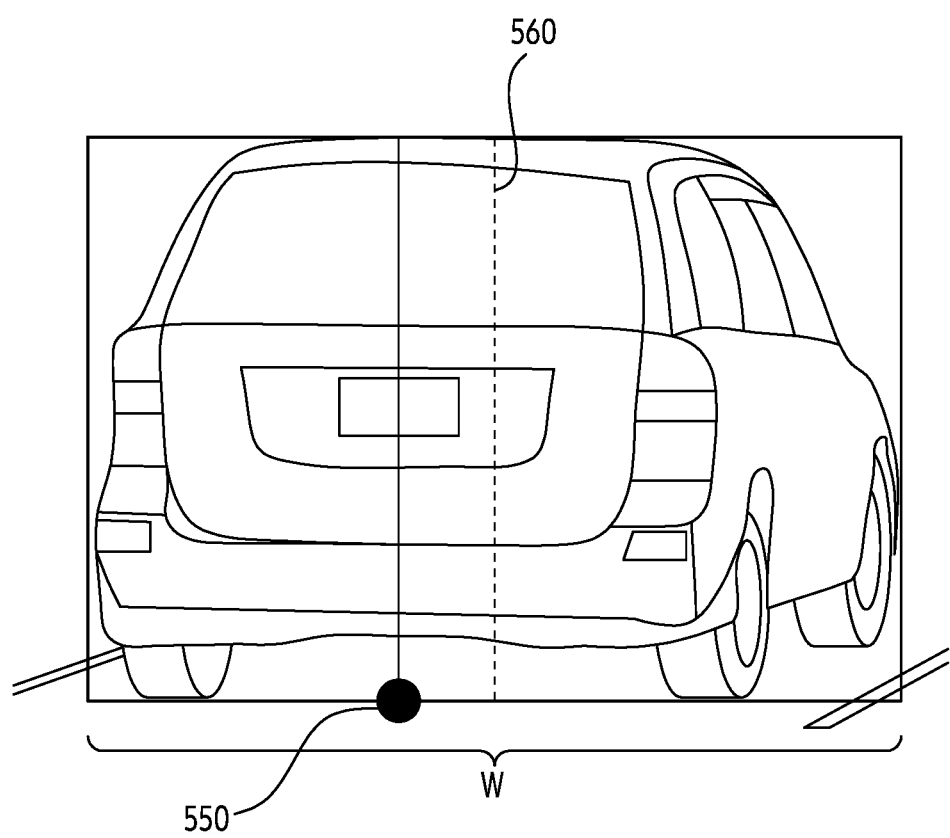
FIG. 5G illustrates an example of detecting a center of a rear surface of a target vehicle according to various embodiments.

FIG. 5G illustrates an example of detecting a center of a rear surface of a target vehicle according to various embodiments.

Referring to FIG. 4, in operation 410, the electronic device 100 may obtain a front image of the host vehicle 200. For example, the processor 120 may photograph the front of the vehicle equipped with the electronic device 100 through the camera 110. The vehicle equipped with the electronic device 100 may correspond to the host vehicle 200 of FIG. 2. The front image may correspond to the image of FIG. 5A.

In operation 420, the electronic device 100 may identify the target vehicle in the front image. Referring to FIG. 5A together, the processor 120 may identify a plurality of front vehicles based on the vehicle detection model. The processor 120 may identify at least one vehicle among the plurality of front vehicles as the target vehicle. For example, the processor 120 may set the front vehicle driving in the same lane as the host vehicle 200 as the target vehicle. For another example, the processor 120 may set a front vehicle driving in a lane neighboring the host vehicle 200 as the target vehicle. Hereinafter, in the detailed description, it will be described based on setting a front vehicle driving in a neighboring lane of the host vehicle 200 as the target vehicle.

In operation 430, the electronic device 100 may set the bounding box corresponding to the target vehicle. The processor 120 may set the bounding box for each of the plurality of front vehicles detected in the front image by using the vehicle detection model. The bounding box may refer to a box having the smallest size surrounding the detected object. For example, referring to FIG. 5A together, the processor 120 may generate the two bounding boxes based on the front image. The processor 120 may generate the bounding box 510 for a front vehicle driving in a neighboring lane of the host vehicle 200. The processor 120 may generate the bounding box 520 for a front vehicle driving in the same lane of the host vehicle 200.

In operation 440, the electronic device 100 may generate the sliding window having the same height as the height of the bounding box 510 and the width of half the width of the bounding box 510. Referring to FIG. 5B together, the processor 120 may set the front vehicle driving in the neighboring lane of the host vehicle 200 as the target vehicle and may generate the bounding box 510 having a minimum area including the target vehicle. For example, the width of the bounding box 510 may be w, and the height of the bounding box 510 may be h. Referring to FIG. 5B together, the processor 120 may generate the sliding window 530 in response to generation of the bounding box 510. The sliding window 530 may be shifted by a predefined pixel interval on an area at least overlapping the bounding box 510. The sliding window 530 may be a window having a size smaller than that of the bounding box 510. For example, the height of the sliding window 530 may be h, which is the same height as the bounding box 510. The width of the sliding window 530 may be sw. The sw may be half value of the width of the bounding box 510, in other words, 0.5w.

In operation 450, the electronic device 100 may divide the left area into a first area and the right area into a second area based on the middle position of the width of the sliding window 530. Referring to FIG. 5B together, the processor 120 may distinguish the sliding window into two areas. For example, the processor 120 may identify the left area of the sliding window 530 as the first area 532. The processor 120 may identify the right area of the sliding window 530 as the second area 534.

In operation 460, the electronic device 100 may generate an extended bounding box 540 by adding dummy areas 542 having half the size of the sliding window 530 to the left and right sides of the bounding box 510, respectively. The expanded bounding box 540 may correspond to the entire area for which the sliding window 530 performs the symmetric comparison process. According to an embodiment, the processor 120 may add a dummy area 542 to the left area of the bounding box 510. The size of the dummy area 542 may be the same as that of the first area 532 of the sliding window 530. Each of the pixels included in the dummy area 542 may have a predetermined pixel value. One pixel may have a value of 0 to 255 (Red, Green, and Blue), respectively. For example, each of the pixels included in dummy area 542 of the processor 120 may correspond to a value of (128, 128, 128). For another example, the processor 120 may set the pixels included in the dummy area 542 as an average value of all pixel values included in the front image. For another example, the processor 120 may set pixels included in the dummy area 542 as an average value of all pixel values included in the bounding box 510. According to an embodiment, the processor 120 may add the dummy area 544 to the right area of the bounding box 510. The size of the dummy area 544 may be the same as that of the second area 534 of the sliding window 530. Each of the pixels included in the dummy area 544 may have a predetermined pixel value. One pixel may have a value of 0 to 255 (Red, Green, Blue), respectively. For example, each of the pixels included in dummy area 544 of the processor 120 may correspond to a value of (128, 128, 128). For another example, the processor 120 may set the pixels included in the dummy area 544 as an average value of all pixel values included in the front image. For another example, the processor 120 may set the pixels included in the dummy area 544 as an average value of all pixel values included in the bounding box 510. In the above-described embodiment, the dummy area 542 and the dummy area 544 have been described based on including pixels having the same value, but are not limited thereto. According to various embodiments, the pixel value of the dummy area 542 and the pixel value of the dummy area 544 may be different from each other. For example, the pixel value of the dummy area 542 may be set to an average value of pixels included in the left area of the front image or an average value of pixels included in the left area of the bounding box 510. For another example, the pixel value of the dummy area 544 may be set to an average value of pixels included in the right area of the front image or an average value of pixels included in the right area of the bounding box 510.

According to an embodiment, the expanded bounding box 540 may correspond to h, which is the same height as the sliding window 530 and the bounding box 510. The width of the expanded bounding box 540 may be 1.5 times that of the bounding box 510, in other words, 1.5w. The width of the expanded bounding box 540 may be three times that of the sliding window 530, in other words, 3sw.

In operation 470, the electronic device 100 may obtain the sums of the pixel difference values of the first area 532 and the second area 534 by shifting the sliding window 530 by a predefined pixel interval with respect to the entire width of the extended bounding box 540. Referring to FIG. 5E together, the bounding box 510 may include all 32 pixels. At the viewpoint of (a), the sliding window 530 may be positioned on an area overlapping the bounding box 510. For example, the first area 532 of the sliding window 530 may be positioned on "1x" pixels. For example, the second area 534 of the sliding window 530 may be positioned on "2x" pixels. The processor 120 may change the pixels of the second area 534 so that the second area 534 is inverted left and right in order to calculate a pixel difference value between the first area 532 and the second area 534. For example, at the viewpoint of (b), the processor 120 may invert the second area 534 left and right. The processor 120 may substitute pixel 21, pixel 23, pixel 25, and pixel 27 of the second area 534 with pixel 22, pixel 24, pixel 26, and pixel 28, respectively. For example, referring to FIG. 5D, the second area 534-1 may be changed to and displayed as the second area 534-2 based on the substitution. Thereafter, the processor 120 may calculate difference values between pixels of the first area 532 and pixels of the left and right inverted second area 534, respectively, and may sum the difference values. For example, the processor 120 may calculate a difference between the pixel value of the pixel 11 of the first area 532 and the pixel value of pixel 22 corresponding to the same position as the pixel 11. The processor 120 may calculate 8 difference values for pixel 11 to pixel 18, and may obtain a sum by summing the 8 difference values.

According to an embodiment, the processor 120 may shift the sliding window 530 by a predefined pixel interval. At the viewpoint (c), the sliding window 530 may be shifted to the right by one pixel compared to the viewpoint (a). Compared to the viewpoint (a), the first area 532 of the sliding window 530 may include pixel 12, pixel 21, pixel 14, pixel 23, pixel 16, pixel 25, pixel 18, and pixel 27. The second area 534 of the sliding window 530 may include pixel 22, pixel 31, pixel 24, pixel 33, pixel 26, pixel 35, pixel 28, and pixel 37. According to an embodiment, the processor 120 may change the pixels of the second area 534 so that the second area 534 is inverted left and right in order to calculate a pixel difference value between the first area 532 and the second area 534. For example, at the viewpoint (d), the processor 120 may invert the second area 534 left and right. The processor 120 may substitute pixel 22, pixel 24, pixel 26, and pixel 28 of the second area 534 with pixel 31, pixel 33, pixel 35, and pixel 37, respectively. Thereafter, the processor 120 may calculate difference values between pixels of the first area 532 and pixels of the left and right inverted second area 534, respectively, and may sum the difference values. For example, the processor 120 may calculate a difference between the pixel value of the pixel 12 of the first area 532 and the pixel value of pixel 31 corresponding to the same position as the pixel 12.

In the above-described embodiment, the pixels of the second area 534 have been described based on inverting left and right, but is not limited thereto. According to embodiments, pixels of the first area 532 may be inverted to the left and right, and a difference between pixels of the first area 532 and the second area 534 may be calculated.

In the above-described embodiment, the sliding window 530 is illustrated to be shifted from left to right, but is not limited thereto. According to various embodiments, the sliding window 530 may be shifted from the right to the left.

In operation 480, the electronic device 100 may identify a position where the sum of the difference values between the pixels of the first area 532 and the pixels of the second area 534 is minimum. The processor 120 may identify the most left-right symmetrical point within the bounding box 510 by shifting the sliding window 530 along the bounding box 510. The pixel difference value between the first area 532 of the sliding window 530 and the second area 534 inverted to left and right may be related to how left-right symmetrical the area included in the sliding window 530 is. For example, when the area corresponding to the sliding window 530 is perfectly left-right symmetrical, the difference between the pixels of the first area 532 and the pixels of the second area 534 inverted to the left and right may correspond to 0. For example, looking at the rear of the vehicle, a point close to the left-right symmetry may be the center of the rear. In other words, a position where the sum of pixel difference values is minimum may correspond to the center of the target vehicle. Specifically, referring to FIG. 5G, the center x-axis 550 of the sliding window 530 where the sum of pixel difference values is minimum may be the center of the rear surface of the target vehicle.

Figure 6:
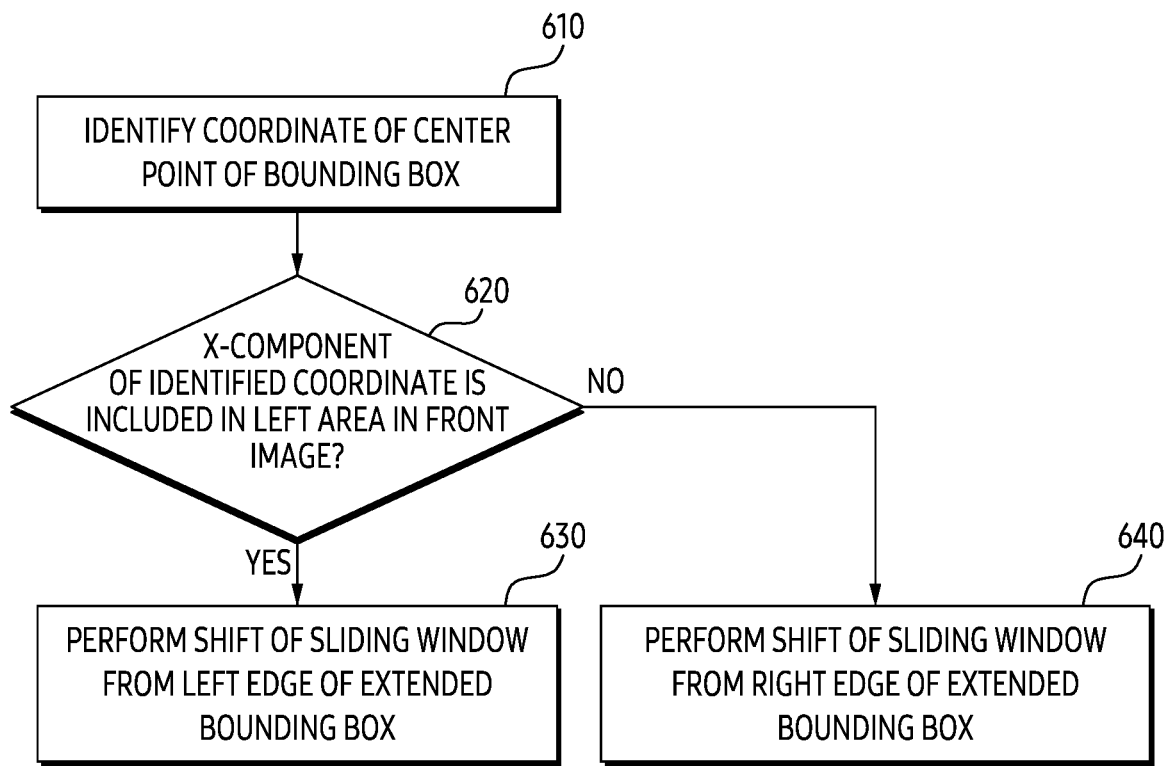
FIG. 6 is a flowchart illustrating an operating method for determining a start position of a sliding window according to various embodiments.

FIG. 6 is a flowchart illustrating an operating method for determining a start position of a sliding window 530 according to various embodiments.

Referring to FIG. 6, in operation 610, the electronic device 100 may identify the coordinates of the center point of the bounding box 510. For example, referring to FIG. 5B together, when the left lower corner of the bounding box 510 is set to (0, 0), the coordinates of the center point may be (w/2, h/2). According to various embodiments, the processor 120 may omit the calculation on the y-axis in order to reduce the complexity of the operation.

In operation 620, the electronic device 100 may determine whether the x-component of the identified coordinate is included in the left area in the front image. For example, referring to FIG. 5A, the bounding box 510 of the target vehicle driving in the lane neighboring the host vehicle 200 may be included in the left area based on the center x-axis of the front image. Since the bounding box 510 is already included in the left area of the front image, the x-coordinate of the center point of the bounding box 510 may also be included in the left area of the front image. For another example, in case that the target vehicle is driving in the right lane of the host vehicle 200, the x-coordinate of the center point of the bounding box may be included in the right area in the front image.

In operation 630, the electronic device 100 may perform the shift of the sliding window 530 starting from the left edge of the extended bounding box 540. In operation 620, the processor 120 may identify that the target vehicle corresponding to the bounding box 510 is driving in the left lane in case that the x-coordinate of the center point of the bounding box 510 is included in the left area of the front image. The processor 120 may estimate that the center x-axis of the rear of the target vehicle driving in the left lane is positioned on the left side within the bounding box 510. Accordingly, when generating the sliding window 530 and starting the shift, the processor 120 may control the shift to start from the left peripheral of the extended bounding box 540. For example, at the start of the shift, the sliding window 530 may include a left dummy area of the extended bounding box 540 and a portion of the bounding box 510.

In operation 640, the electronic device 100 may perform the shift the sliding window 530 starting from the right edge of the extended bounding box 540. In operation 620, the processor 120 may identify that the target vehicle corresponding to the bounding box 510 is driving in the right lane of the host vehicle 200 in case that the x-coordinate of the center point of the bounding box 510 is included in the right area of the front image. The processor 120 may estimate that the center x-axis of the rear of the target vehicle driving in the right lane is positioned on the right side within the bounding box 510. Accordingly, when generating the sliding window 530 and starting the shift, the processor 120 may control the shift to start from the right peripheral of the extended bounding box 540. For example, at the start of the shift, the sliding window 530 may include a right dummy area of the extended bounding box 540 and a portion of the bounding box 510.

Figure 7A:
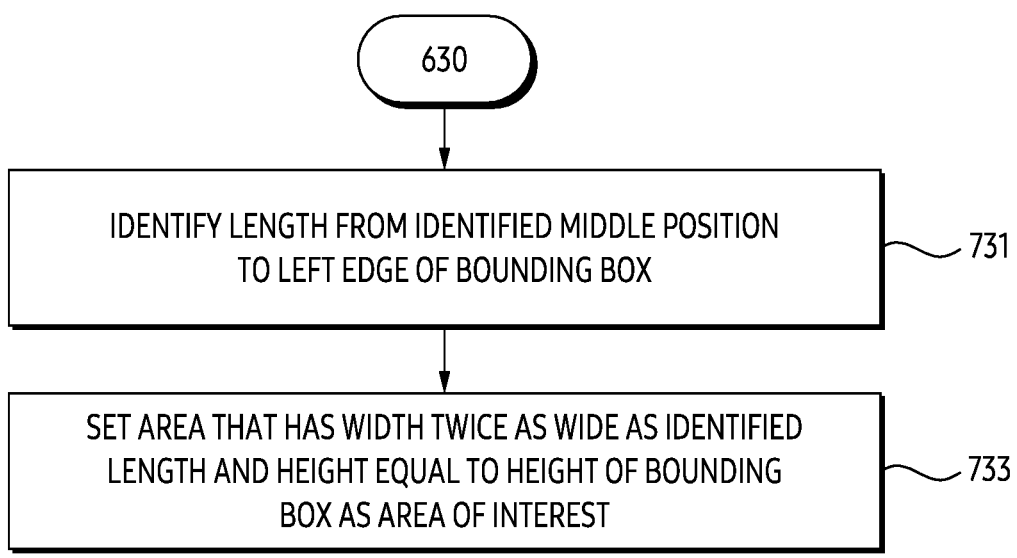
FIG. 7A is a flowchart illustrating an operating method of setting an area of interest according to various embodiments.

FIG. 7A is a flowchart illustrating an operating method of setting an area of interest according to various embodiments.

Figure 7B:
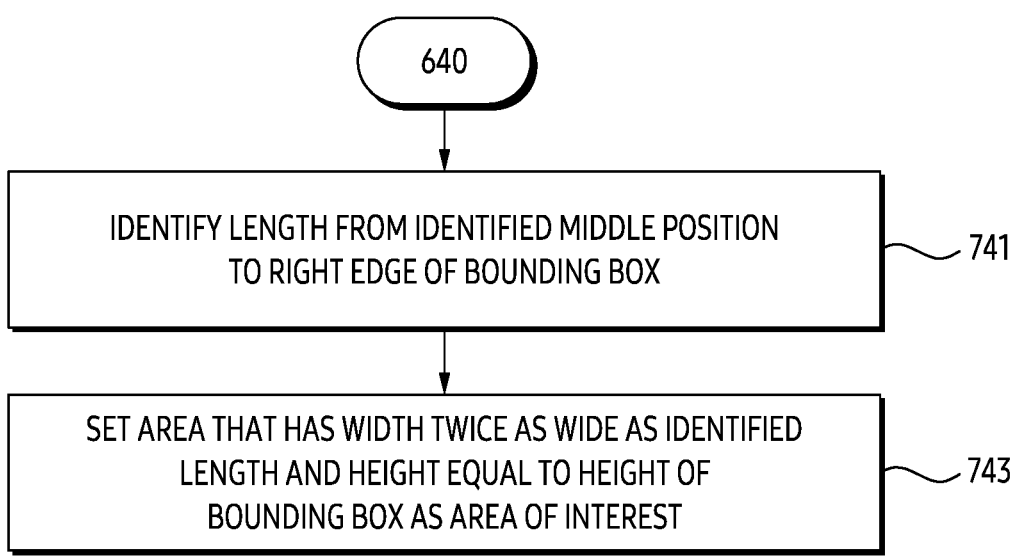
FIG. 7B is a flowchart illustrating an operating method of setting an area of interest according to various embodiments.

FIG. 7B is a flowchart illustrating an operating method of setting an area of interest according to various embodiments.

Figure 7C:
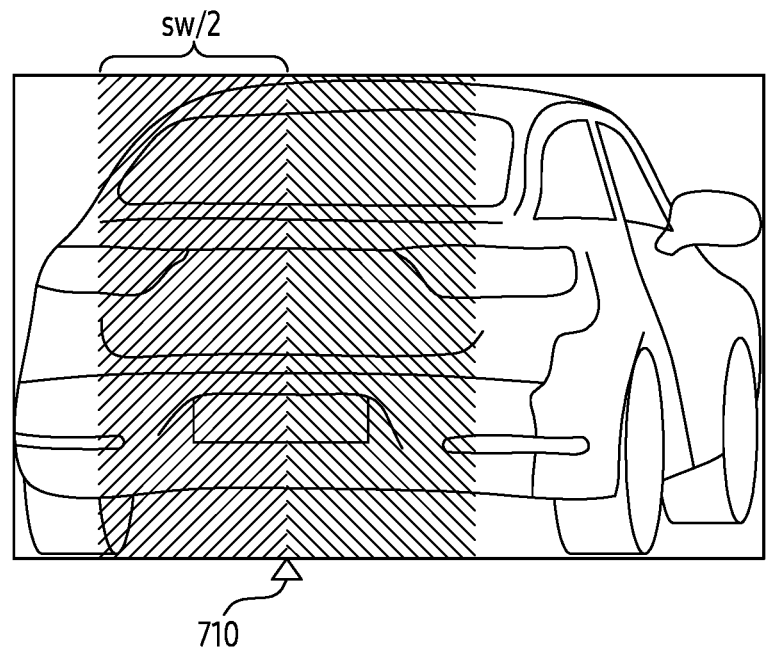
FIG. 7C is an example of setting an area of interest according to various embodiments.
Figure 7C:
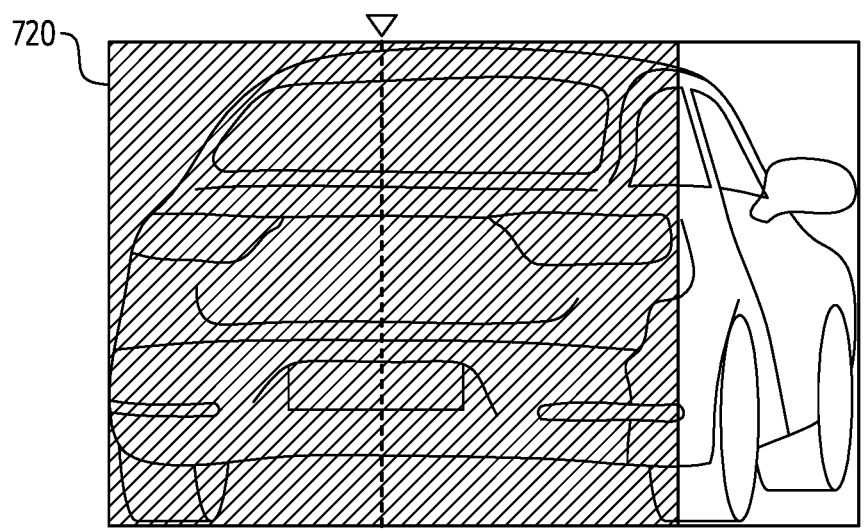

FIG. 7C is an example of setting an area of interest according to various embodiments.

Referring to FIG. 7A, in operation 731, the electronic device 100 may identify the length from the identified middle position to the left edge of the bounding box 510. The identified middle position may refer to the center x-axis of the sliding window 530 corresponding to the point where the sum is minimum. Referring to FIG. 7C together, the identified middle position may correspond to the position 710. The processor 120 may identify the length from the identified position 710 to the left edge. Since the bounding box 510 is a box of a minimum size including an object of the target vehicle, the bounding box 510 may include images of a rear surface of the target vehicle and a side surface of the target vehicle. Accordingly, since the processor 120 has identified that the target vehicle is driving in the left lane of the host vehicle 200, the processor 120 may identify the length from the identified position 710 to the left edge of the bounding box 510. The identified length may correspond to the length of the left half of the rear surface of the target vehicle.

In operation 733, the electronic device 100 may set an area having twice the width of the identified length and the same height as the height of the bounding box 510 as the region of interest 720. Referring to FIG. 7C, since the length identified in operation 731 corresponds to the left half of the rear surface of the target vehicle, the processor 120 may set an area having a width twice the identified length and a height h equal to that of the bounding box 510 as a region of interest 720.

Referring to FIG. 7B, in operation 741, the electronic device 100 may identify the length from the identified middle position to the right edge of the bounding box 510. The identified middle position may refer to the central x-axis of the sliding window 530 corresponding to the point where the sum is minimum. The identified length may correspond to the length of the right half of the rear surface of the target vehicle.

In operation 743, the electronic device 100 may set an area having twice the width of the identified length and the same height as the height of the bounding box 510 as the region of interest 720. Referring to FIG. 7C, since the length identified in operation 741 corresponds to the right half of the rear surface of the target vehicle, the processor 120 may set an area having a width twice the identified length and a height h equal to that of the bounding box 510 as a region of interest 720.

Figure 8:
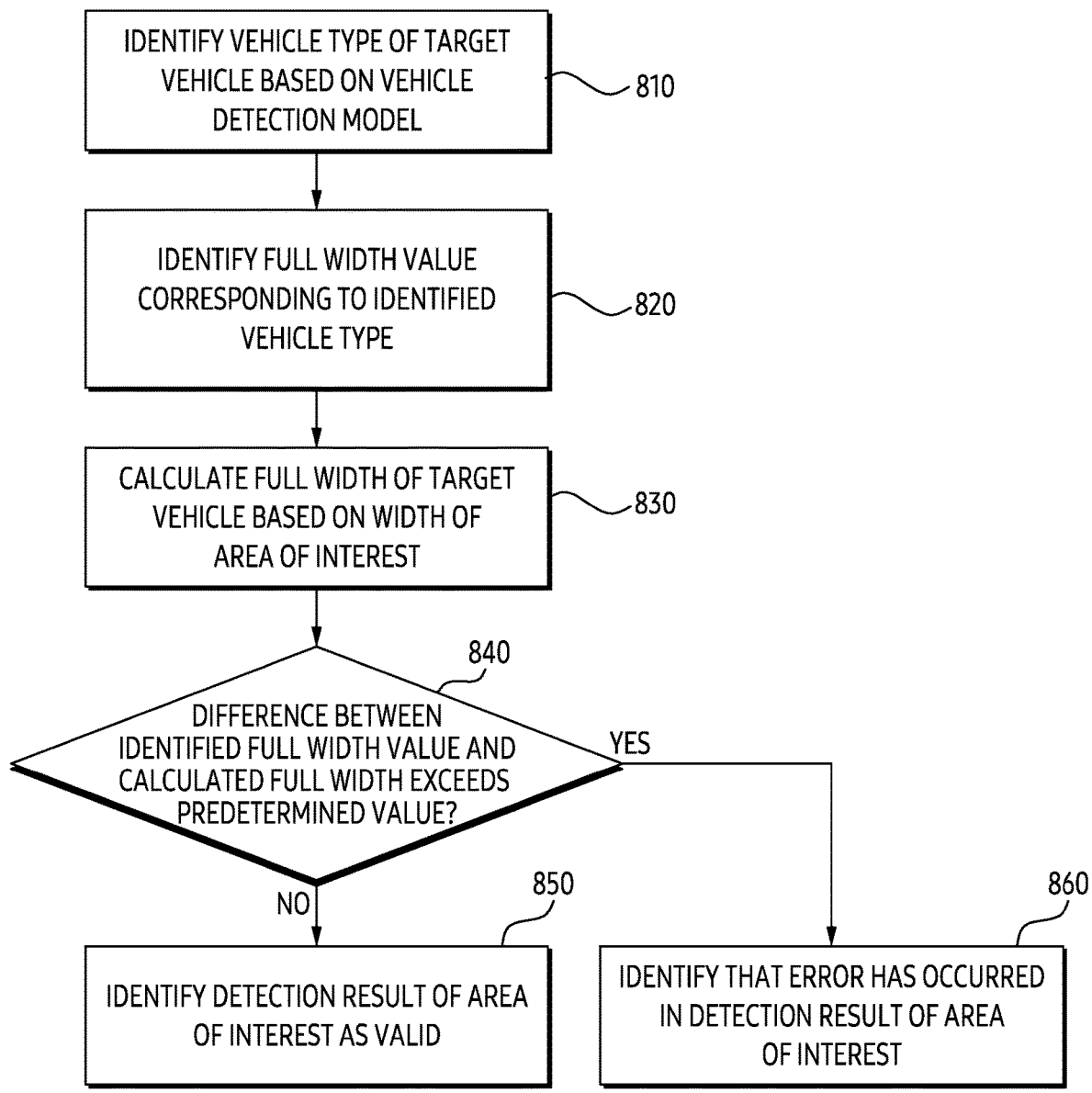
FIG. 8 is a flowchart illustrating an operating method for performing validity determination of a detection result according to various embodiments.

FIG. 8 is a flowchart illustrating an operating method for performing validity determination of a detection result according to various embodiments.

Referring to FIG. 8, in operation 810, the electronic device 100 may identify a target vehicle type based on the vehicle detection model. For example, the vehicle detection model may classify the vehicle type of vehicles in front by detecting objects included in the front image. For example, the vehicle detection model may identify the vehicle type of vehicles in front as any one of a sedan, a SUV (sport utility vehicle), a RV (recreational vehicle), a hatchback, a truck, a bus, and a special vehicle.

In operation 820, the electronic device 100 may identify a full width value corresponding to the identified vehicle type. For example, the processor 120 may store the average full width value for each vehicle type that the vehicle detection model may classify in advance in the memory 140. The average full width value for each vehicle type may be stored in the form of a look-up table. For example, in case that the vehicle type is the sedan, the average full width may be 1860 mm. For example, in case that the vehicle type is the bus, the average full width may be 2490 mm. The processor 120 may identify the full width value corresponding to the vehicle type of the target vehicle classified according to the vehicle detection model by referring to the look-up table.

In operation 830, the electronic device 100 may calculate the full width of the target vehicle based on the width of the area of interest. The processor 120 may calculate the full width of the actual target vehicle by using the width of the region of interest 720 through the process of converting the pixel coordinate system of the front image obtained through the camera 110 into the world coordinate system.

In operation 840, the electronic device 100 may determine whether a difference between the identified full width value and the calculated full width value exceeds a predetermined value. For example, the processor 120 may identify the vehicle type of the target vehicle as the bus based on the vehicle detection model, and may search the memory 140 to identify that the full width corresponding to the vehicle type of the bus is 2490 mm. In addition, the processor 120 may calculate the full width of the target vehicle corresponding to the bus through an operation of converting the region of interest 720 in the front image into the world coordinate system. For example, the full width of the target vehicle calculated by the processor 120 may be 1860 mm. In this case, a difference between the calculated full width value for the target vehicle and the full width value identified according to the vehicle type may be 630 mm. For example, the predetermined value may be 300 mm. The processor 120 may allow an error of 300 mm or less, considering that it is the front image obtained while driving and an average full width value of a plurality of vehicles included in the same vehicle type. The predetermined value may be variably set according to a manufacturer of the processor 120 or the host vehicle 200.

In operation 850, the electronic device 100 may identify the detection result of the region of interest 720 as valid. For example, the target vehicle detected based on the vehicle detection model is the sedan, and the average full width of the sedan may be 1860 mm. In addition, the processor 120 may identify that the full width of the target vehicle is 1930 mm by calculating the width of the actual rear surface of the target vehicle by using the width corresponding to the region of interest 720 of the target vehicle. Since the difference value between the identified full width value and the calculated full width value is only 70 mm, the processor 120 may identify that the region of interest 720 is appropriately set, and the detection result of the region of interest 720 is valid.

In operation 860, the electronic device 100 may identify that an error has occurred in the detection result of the region of interest 720. For example, the target vehicle detected based on the vehicle detection model is the sedan, and the average full width of the sedan may be 1860 mm. In addition, for example, the processor 120 may identify the full width of the target vehicle by calculating the width of the actual rear surface of the target vehicle by using the width corresponding to the region of interest 720 of the target vehicle. In other words, while the detected vehicle type is the sedan, the full width of the target vehicle based on the width of the region of interest 720 may be the same length as the bus. The processor 120 may identify that a difference value between the identified full width value and the calculated full width value is 730 mm. Since the difference value exceeds a predetermined value, the processor 120 may identify that an error has occurred in the process of detecting the region of interest 720.

Figure 9:
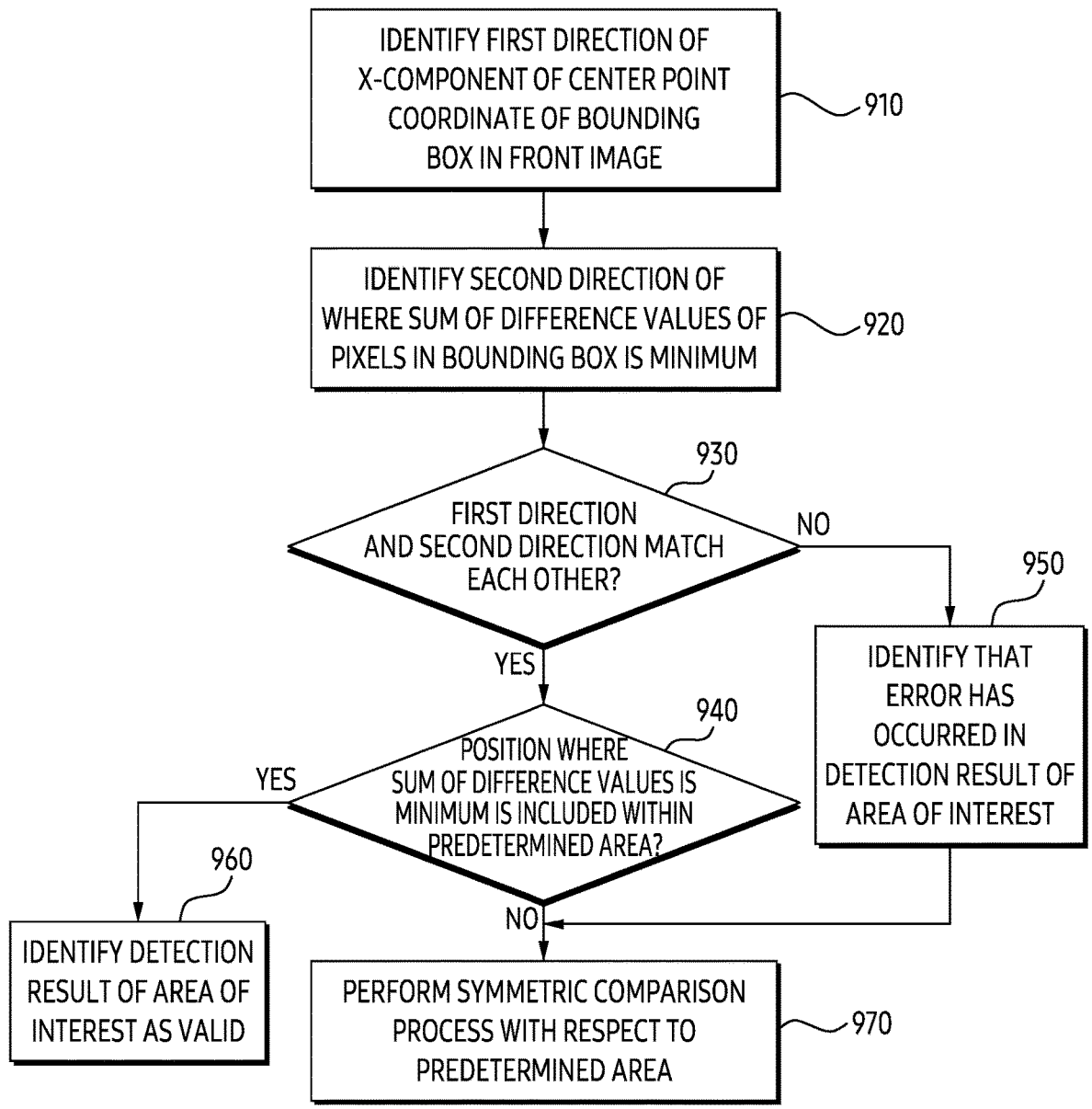
FIG. 9 is a flowchart illustrating an operating method for performing validity determination of a detection result according to various embodiments.

FIG. 9 is a flowchart illustrating an operating method for performing validity determination of a detection result according to various embodiments.

Referring to FIG. 9, in operation 910, the electronic device 100 may identify the first direction of the x-component of the center point coordinate of the bounding box 510 in the front image. The first direction may be the same as a direction of a lane in which the target vehicle is driving. For example, the target vehicle may be a vehicle driving in front of the left lane of the host vehicle 200.

In operation 920, the electronic device 100 may identify the second direction of the position where the sum of the difference values of pixels among the bounding boxes 510 is minimum. The second direction may refer to a direction corresponding to a position where the sum of difference values of the pixels is minimum based on the central x-axis of the bounding box 510. For example, referring to FIG. 5G together, since the center x-axis 550 of the sliding window 530, where the sum of difference values of pixels is the minimum, is positioned on the left side from the center x-axis of the bounding box 510, the second direction may correspond to the left side.

In operation 930, the electronic device 100 may determine whether the first direction and the second direction coincide with each other. For example, in case that the target vehicle is driving in the left lane of the host vehicle 200, the first direction may correspond to the left. In addition, in case that the target vehicle is driving in the left lane of the host vehicle 200, since the central x-axis 550 of the sliding window 530 where the sum of difference values of pixels is the minimum with respect to the center x-axis of the bounding box 510 including the target vehicle is positioned on the left side, the second direction may also correspond to the left. According to an embodiment, in case that the first direction is left while the second direction is identified as the right, since the center of the rear surface of the target vehicle driving in the left lane is identified from the right side, it is possible to identify that an error has occurred in the detection result of the region of interest 720 according to operation 950.

In operation 940, the electronic device 100 may determine whether a position where the sum of the difference values is minimum is included within a predetermined area. The predetermined area may be an area including the size of the first area 532 or the second area 534 along the first direction from the center x-axis of the bounding box 510. In case that the position where the sum of the difference values is minimum is included within the predetermined area, in operation 960, the processor 120 may identify the detection result of the region of interest 720 as valid. On the other hand, in case that the position where the sum of the difference values is minimum is out of the predetermined area, in operation 970, the processor 120 may identify that an error has occurred in the detection result of the region of interest 720 and may perform a symmetric comparison process again with respect to the predetermined area. In other words, the processor 120 may set the predetermined area as a new bounding box and may generate a new sliding window according to the size of the newly set bounding box to shift the sliding window.

Figure 10A:
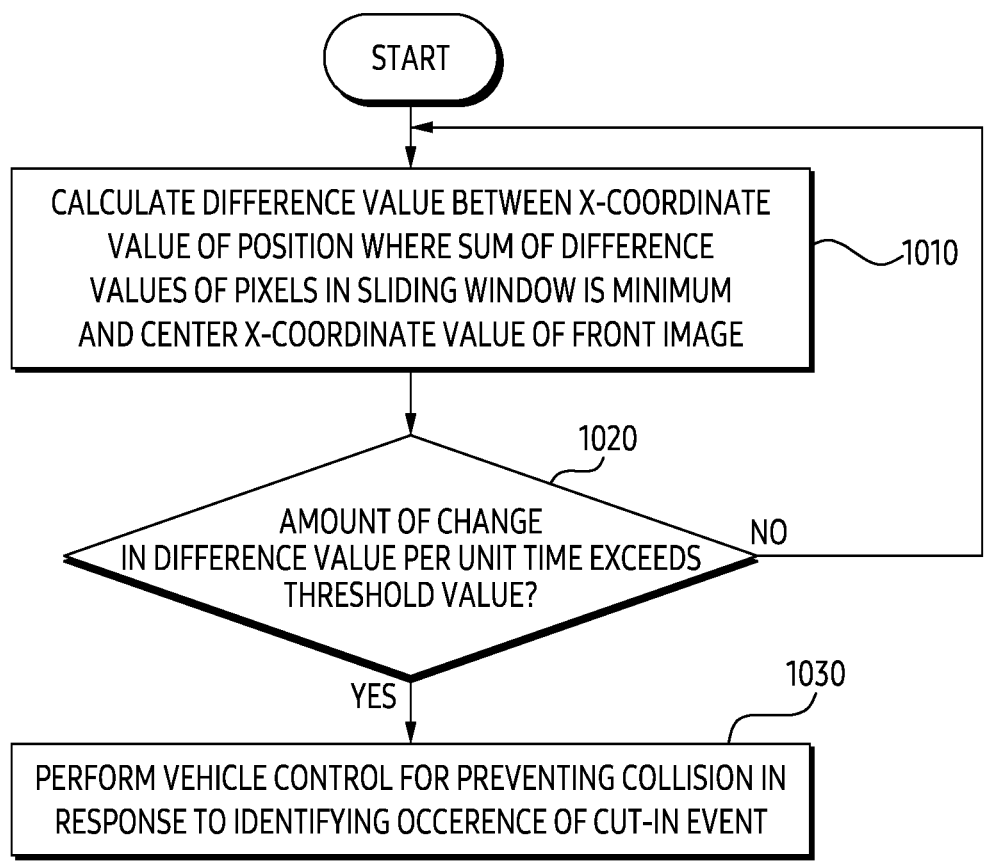
FIG. 10A is a flowchart illustrating an operating method for identification of a cut-in event according to various embodiments.

FIG. 10A is a flowchart illustrating an operating method for identification of a cut-in event according to various embodiments.

Figure 10B:
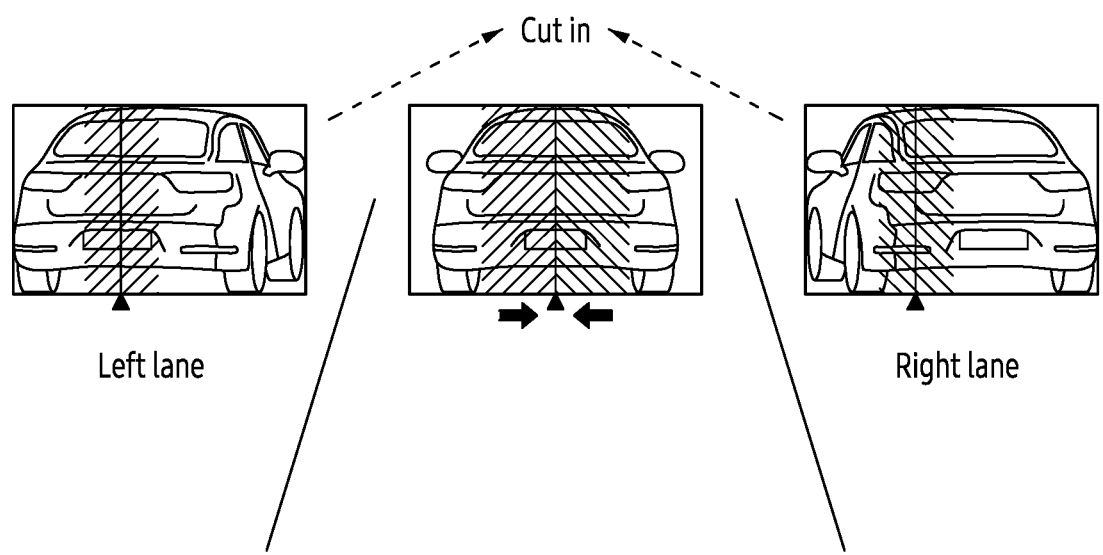
FIG. 10B illustrates an example of a cut-in event according to various embodiments.

FIG. 10B illustrates an example of a cut-in event according to various embodiments.

Referring to FIG. 10A, in operation 1010, the electronic device 100 may calculate a difference value between an x-coordinate value of a position where the sum of the difference values of pixels in the sliding window 530 is the minimum and a center x-coordinate value of the front image. For example, the x-coordinate value at a position where the sum of the difference values of pixels in the sliding window 530 is minimum may correspond to the center of the rear surface of the target vehicle. The processor 120 may calculate how far the center of the rear surface of the target vehicle is from the center of the front image by x-coordinates.

In operation 1020, the electronic device 100 may determine whether the amount of change in the difference value per unit time exceeds the threshold value. The processor 120 may determine how quickly the difference value changes. For example, referring to FIG. 10B together, in case that the target vehicle driving in the left lane of the host vehicle 200 rapidly cuts into the same lane of the host vehicle 200, the amount of change in the difference value per unit time may be large. For another example, in case that the target vehicle driving in the left lane of the host vehicle 200 slowly cuts into the same lane of the host vehicle 200, the amount of change in the difference value per unit time may be relatively small. The processor 120 may identify that a cut-in event occurs in case that it is identified that a change in the difference value per unit time exceeds a threshold value because a target vehicle driving in a neighboring lane rapidly cuts in. The cut-in event may be an event in which a front vehicle driving in a neighboring lane of the host vehicle 200 enters a driving lane of the host vehicle 200.

In operation 1030, the electronic device 100 may perform vehicle control for preventing a collision in response to identification of the occurrence of the cut-in event. For example, the processor 120 may perform control for reducing the velocity of the host vehicle 200 in response to identification of the cut-in event. To this end, the vehicle control unit 210 may generate a control signal instructing deceleration and transmit the control signal to the brake system. For another example, in response to the identification of the cut-in event, the processor 120 may perform control to avoid or prevent collision (collision avoidance/collision mitigation) between the host vehicle 200 and the target vehicle by considering the moving velocity of the target vehicle that triggered the cut-in event, the predicted driving direction of the target vehicle, the driving velocity of the host vehicle 200, and driving direction of the host vehicle 200. To this end, the vehicle control unit 210 may generate a control signal for controlling the driving velocity of the host vehicle and may transfer the control signal to a brake system or an acceleration system. In addition to this, the vehicle control unit 210 may transmit a control signal to a steering system of the host vehicle in case that it is necessary to change the driving direction of the host vehicle 200.

In an embodiment, the acceleration system includes means for supplying driving power of the host vehicle 200 such as an electric motor and an internal combustion engine.

Figure 11:
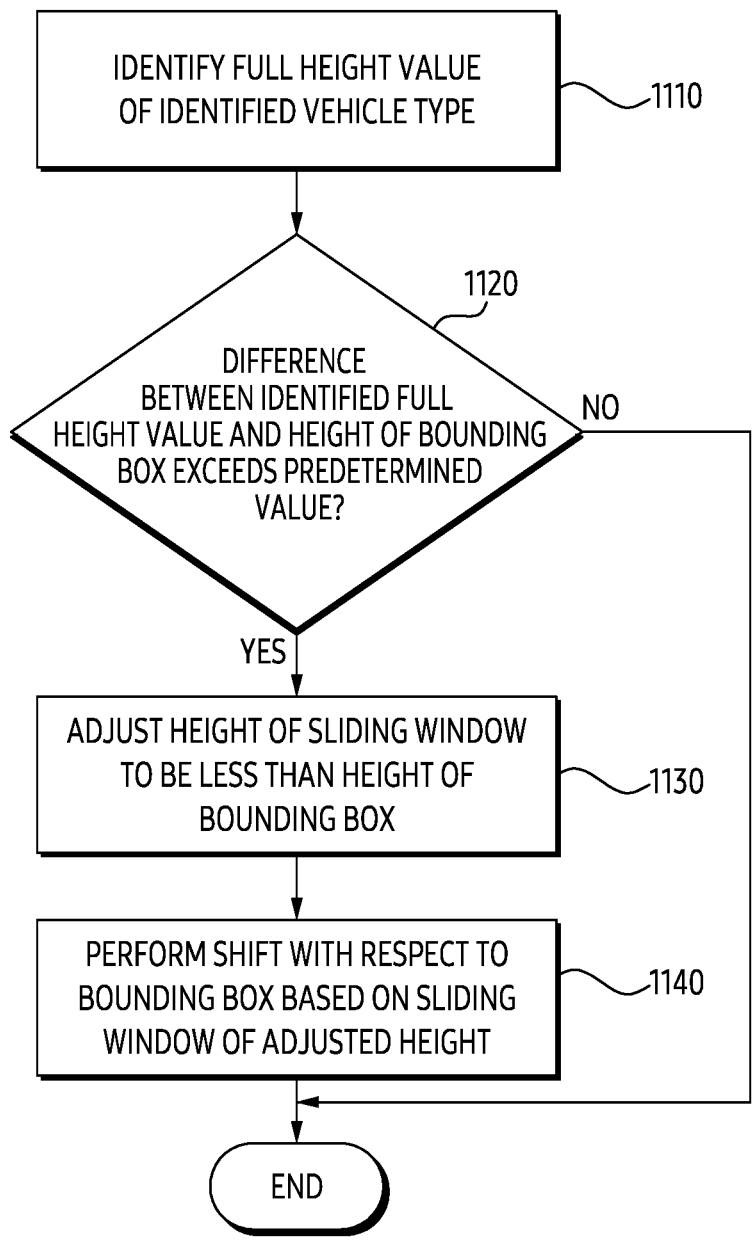
FIG. 11 is a flowchart illustrating an operating method for adjusting a height of a sliding window according to various embodiments.

FIG. 11 is a flowchart illustrating an operating method for adjusting a height of a sliding window 530 according to various embodiments.

Referring to FIG. 11, in operation 1110, the electronic device 100 may identify the vehicle type of the target vehicle based on the vehicle detection model and may identify the full height value of the identified vehicle type. For example, the vehicle detection model may classify the vehicle types of vehicles in front by detecting objects included in the front image. For example, the vehicle detection model may identify the vehicle type of the vehicles in front as any one of a sedan, an SUV, an RV, a hatchback, a truck, a bus, and a special vehicle. The processor 120 may identify the full height value corresponding to the identified vehicle type. For example, the processor 120 may store in advance the average full height value for each vehicle type that the vehicle detection model may classify in the memory 140. The average full width value for each vehicle type may be stored in the form of a look-up table. For example, in case that the vehicle type is the sedan, the average full height may be 1450 mm. For example, in case that the vehicle type is the SUV, the average full height may be 1800 mm. For example, in case that the vehicle type is the bus, the average full width may be 3435 mm. The processor 120 may identify an full height value corresponding to the vehicle type of the target vehicle classified according to the vehicle detection model by referring to the look-up table.

In operation 1120, the electronic device 100 may determine whether a difference between the full height value according to the identified vehicle type and the full height value calculated according to the height of the bounding box exceeds the predetermined value. For example, the processor 120 may identify the type of the target vehicle as the sedan based on the vehicle detection model, and may search the memory 140 to identify that the full height value corresponding to the sedan vehicle type is 1450 mm. The processor 120 may calculate the full height of the target vehicle based on the height of the region of interest 720. The processor 120 may calculate the full height of the actual target vehicle by using the height of the region of interest 720 through a process of converting the pixel coordinate system of the front image obtained through the camera 110 into the world coordinate system. For example, the full height of the target vehicle calculated by the processor 120 may be 3410 mm. In this case, the difference between the calculated full height value for the target vehicle and the full height value identified according to the vehicle type may be 1960 mm. In case that the difference between the identified full height values does not exceed a predetermined value, the processor 120 may determine that there is no load on top of the target vehicle and may terminate the procedure. For example, the predetermined value may be 500 mm. The processor 120 may allow an error of 500 mm or less in consideration of a point that is the front image obtained while driving, the average full height value of a plurality of vehicles included in the same vehicle type, and the like. The predetermined value may be variably set depending on the manufacturer of the processor 120 or the host vehicle 200.

In case that the difference between the identified full height values exceeds the predetermined value, the processor 120 may determine that a load exists on top of the target vehicle and a bounding box 510 including the load is generated.

In operation 1130, the electronic device 100 may adjust the height of the sliding window 530 to be smaller than the height of the bounding box 510. The processor 120 may identify that difference between the identified full height values exceeds a predetermined value and determine that the target vehicle has a load (e.g., cargo, roof back, and roof rack) on the top. Accordingly, the processor 120 may perform a symmetrical comparison process by setting the height of the sliding window 530 to be less than the height of the bounding box 510 and shifting the sliding window 530 left and right in contact with the lower edge of the bounding box 510. According to an embodiment, the processor 120 may variably reduce the height of the sliding window 530 as the difference between the identified full height values increases.

Figure 12:
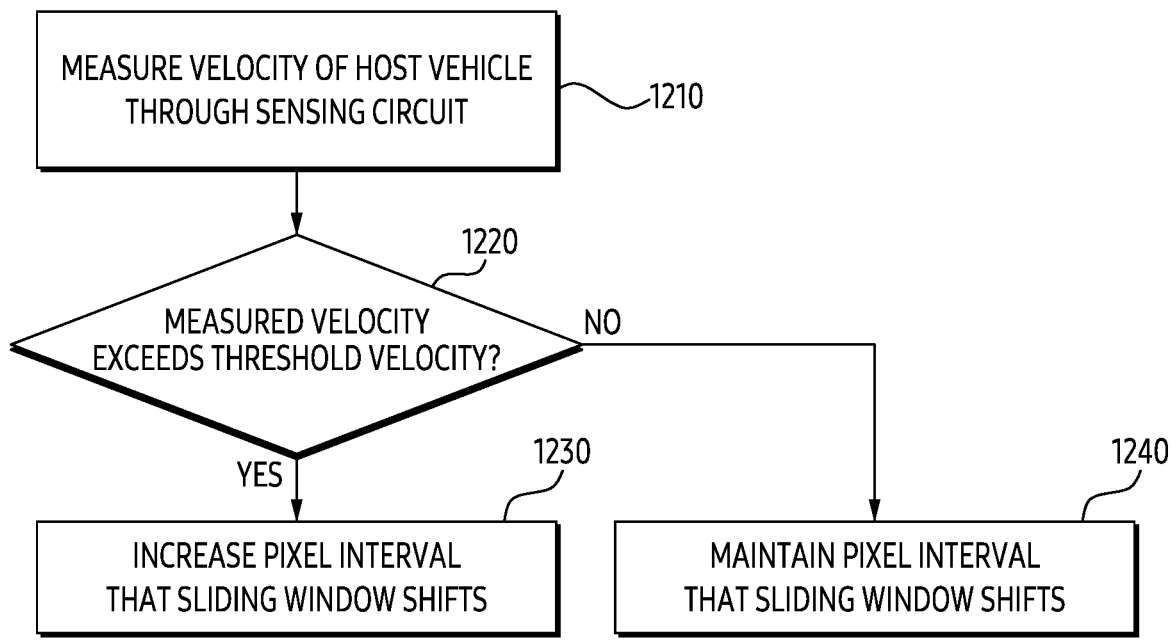
FIG. 12 is a flowchart illustrating an operating method for variably setting a pixel interval for shifting a sliding window according to various embodiments.

FIG. 12 is a flowchart illustrating an operating method for variably setting a pixel interval for shifting a sliding window 530 according to various embodiments.

Referring to FIG. 12, in operation 1210, the electronic device 100 may measure the velocity of the host vehicle 200 through the sensing circuit 150. For example, the processor 120 may activate an acceleration sensor (not illustrated) of the sensing circuit 150. The acceleration sensor (not illustrated) may measure the driving velocity of the host vehicle 200 including the electronic device 100.

In operation 1220, the electronic device 100 may determine whether the measured velocity exceeds the threshold velocity. The threshold velocity may be the reference velocity of judgment to increase the velocity of the symmetric comparison process for rear surface detection of the target vehicle because the velocity of the host vehicle 200 is fast. For example, the faster the velocity of the host vehicle 200, the faster the rear surface detection of the target vehicle should be performed, but in case that the sliding window 530 is shifted pixel by pixel, the velocity of the rear surface detection of the target vehicle may be slowed.

In operation 1230, the electronic device 100 may increase a pixel interval shifted by the sliding window 530. For example, the threshold velocity may be 160 Km/h. In other words, in case that the host vehicle 200 drives at a velocity of 160 Km per hour, the processing velocity for rear surface detection of the target vehicle may need to be increased. The processor 120 may increase a predefined pixel interval for shifting the sliding window 530 in response to the measured velocity of the host vehicle 200 exceeding the threshold velocity. In operation 1240, the electronic device 100 may maintain a pixel interval shifted by the sliding window 530. For example, in case that the velocity of the host vehicle 200 is less than the threshold velocity, the sliding window 530 may be shifted for each pixel. In case that the velocity of the host vehicle 200 exceeds the threshold velocity, the processor 120 may increase the pixel interval at which the sliding window 530 is shifted to two or three.

At as mentioned above, according to an embodiment, an electronic device provided in an autonomous vehicle, the electronic device comprising, a camera, a memory storing at least one instruction, and at least one processor operatively coupled with the camera, wherein the at least one processor is configured to, when the instructions are executed obtain a front image in which the autonomous vehicle is driving through the camera, identify a target vehicle in the front image based on the vehicle detection model stored in the memory, generate a bounding box corresponding to the target vehicle in response to an identification of the target vehicle, generate a sliding window having a height equal to the height of the bounding box and having a width half of the width of the bounding box, divide the bounding box into a first area positioned left based on a middle position of the bounding box, and a second area positioned right based on the middle position of the bounding box, generate an extended bounding box by extending the first area in a left direction and extending the second area in a right direction, wherein size of the extended bounding box is twice as wide as size of the bounding box, obtain a sum of a pixel difference values between the first area and the second area for each shift by sequentially shifting the sliding window by a predefined pixel interval with respect to all of width of the extended bounding box, and identify a point that corresponds to a minimum value among sum values respectively indicating the sums that are obtained according to the shifting.

According to various embodiments, the electronic device the at least one processor is configured to, when the instructions are executed change each of the pixels of the second area for inverting the second area left and right, obtain the sums of the pixel difference values by adding up difference values of each of the pixels of the inverted second area and each of the pixels of the first area.

According to various embodiments, the electronic device the at least one processor is configured to, when the instructions are executed identify a coordinate of a center point of the bounding box, obtain a first direction based on identifying whether the identified coordinate is included in a left area or a right area in the front image, wherein the sliding window is started the shifting from an edge corresponding to the first direction among four edges forming the bounding box.

According to various embodiments, the at least one processor is configured to, when the instructions are executed set an area of interest that has a width twice as wide as an area and a height equal to the height of the bounding box from the point where the sum value is minimum to the edge corresponding to the first direction, based on the point where the sum value is minimum.

According to various embodiments, the at least one processor is configured to, when the instructions are executed obtain the second direction based on identifying whether the point where the sum value is minimum is included in the left area or the right area within the bounding box, determine that the identification of the point where the sum value is minimum is not valid, when the first direction and the second direction do not match.

According to various embodiments, the at least one processor is configured to, when the instructions are executed identify whether the point where the sum value is minimum is included within a predetermined area in the first direction from a center x-axis of the front image, when the first direction and the second direction match, determine that the identification of the point where the sum value is minimum is not valid, when the point where the sum value is minimum is not included within the predetermined area.

According to various embodiments, the electronic device further comprises a sensor module for measuring a velocity of the autonomous vehicle. the at least one processor is configured to, when the instructions are executed measure the velocity of the autonomous vehicle through the sensor module, perform a comparison between the measured velocity and a threshold velocity.

According to various embodiments, the at least one processor is configured to, when the instructions are executed increase the predefined pixel interval when the measured velocity exceeds the threshold velocity.

According to various embodiments, the at least one processor is configured to, when the instructions are executed calculate a difference value between a x-coordinate value of the point where the sum value is minimum and a center x-coordinate value of the front image, identify an occurrence of a cut-in event, in response to identifying that an amount of change in the difference value per unit time exceeds a negative threshold value, perform vehicle control for preventing collision of the autonomous vehicle in response to identifying the occurrence of the cut-in event.

According to various embodiments, the at least one processor is configured to, when the instructions are executed identify a vehicle type of the target vehicle, based on the vehicle detection model, identify a full width value corresponding to the identified vehicle type, calculate a full width value of the target vehicle, based on the width of area of the interest, decide whether a difference of the full width value corresponding to the identified vehicle type and the calculated the full width value of the target vehicle, exceeds a predetermined value, identify that a detection result of the area of interest is not valid when the difference of the full width value corresponding to the identified vehicle type and the calculated the full width value of the target vehicle, exceeds a predetermined value.

At as mentioned above, according to an embodiment, method of operating an electronic device provide in an autonomous vehicle, obtaining a front image in which the autonomous vehicle is driving through a camera, identifying a target vehicle in the front image based on the vehicle detection model stored in a memory, generating a bounding box corresponding to the target vehicle in response to an identification of the target vehicle, generating a sliding window having a height equal to the height of the bounding box and having a width half of the width of the bounding box, dividing the bounding box into a first area positioned left based on a middle position of the bounding area and a second area positioned right based on the middle position of the bounding area, generating an extended bounding box by extending the first area in a left direction and extending the second area in a right direction wherein size of the extended bounding box is twice as wide as size of the bounding box, obtaining a sum of a pixel difference values between the first area and the second area for each shift by sequentially shifting the sliding window by a predefined pixel interval with respect to all of width of the extended bounding box, and identifying a point that corresponds to a minimum value among sum values respectively indicating the sums that are obtained according to the shifting.

According to various embodiments, the operation of obtaining the sum of the pixel difference values between the first area and the second area further comprises changing each of the pixels of the second area so that the second area is left and right inverted, obtaining the sums of the pixel difference values by adding up difference values of each of the pixels of the inverted second area and each of the pixels of the first area.

According to various embodiments, the method further comprises identifying a coordinate of a center point of the bounding box, obtaining a first direction based on identifying whether the identified coordinate is included in a left area or a right area in the front image, wherein the sliding window is started the shifting from an edge corresponding to the first direction among four edges forming the bounding box.

According to various embodiments, the method further comprises setting an area of interest that has a width twice as wide as an area and a height equal to the height of the bounding box from the point where the sum value is minimum to the edge corresponding to the first direction, based on the point where the sum value is minimum.

According to various embodiments, the method further comprises obtaining the second direction based on identifying whether the point where the sum value is minimum is included in the left area or the right area within the bounding box, determining that the identification of the point where the sum value is minimum is not valid, when the first direction and the second direction do not match.

According to various embodiments, the method further comprises identifying whether the point where the sum value is minimum is included within a predetermined area in the first direction from a center x-axis of the front image, when the first direction and the second direction match, determining that the identification of the point where the sum value is minimum is not valid, when the point where the sum value is minimum is not included within the predetermined area.

According to various embodiments, the method further comprises measuring the velocity of the autonomous vehicle through the sensor module, performing a comparison between the measured velocity and a threshold velocity.

According to various embodiments, the method further comprises increasing the predefined pixel interval when the measured velocity exceeds the threshold velocity.

According to various embodiments, the method further comprises calculating a difference value between a x-coordinate value of the point where the sum value is minimum and a center x-coordinate value of the front image, identifying an occurrence of a cut-in event, in response to identifying that an amount of change in the difference value per unit time exceeds a negative threshold value, performing vehicle control for preventing collision of the autonomous vehicle in response to identifying the occurrence of the cut-in event.

According to various embodiments, the method further comprises identifying a vehicle type of the target vehicle, based on the vehicle detection model, identifying a full width value corresponding to the identified vehicle type, calculating a full width value of the target vehicle, based on the width of area of the interest, deciding whether a difference of the full width value corresponding to the identified vehicle type and the calculated the full width value of the target vehicle, exceeds a predetermined value, identifying that a detection result of the area of interest is not valid when the difference of the full width value corresponding to the identified vehicle type and the calculated the full width value of the target vehicle, exceeds a predetermined value.

The apparatus described above may be implemented as a combination of hardware components, software components, and/or hardware components and software components. For example, the devices and components described in the embodiments may be implemented using one or more general purpose computers or special purpose computers such as processors, controllers, arithmetical logic unit (ALU), digital signal processor, microcomputers, field programmable gate array (FPGA), PLU(programmable logic unit), microprocessor, any other device capable of executing and responding to instructions. The processing device may perform an operating system OS and one or more software applications performed on the operating system. In addition, the processing device may access, store, manipulate, process, and generate data in response to execution of the software. For convenience of understanding, although one processing device may be described as being used, a person skilled in the art may see that the processing device may include a plurality of processing elements and/or a plurality of types of processing elements. For example, the processing device may include a plurality of processors or one processor and one controller. In addition, other processing configurations, such as a parallel processor, are also possible.

The software may include a computer program, code, instruction, or a combination of one or more of them and configure the processing device to operate as desired or command the processing device independently or in combination. Software and/or data may be embodied in any type of machine, component, physical device, computer storage medium, or device to be interpreted by a processing device or to provide instructions or data to the processing device. The software may be distributed on a networked computer system and stored or executed in a distributed manner. Software and data may be stored in one or more computer-readable recording media.

The method according to the embodiment may be implemented in the form of program instructions that may be performed through various computer means and recorded in a computer-readable medium. In this case, the medium may continuously store a computer-executable program or temporarily store the program for execution or download. In addition, the medium may be a variety of recording means or storage means in which a single or several hardware are combined and is not limited to media directly connected to any computer system and may be distributed on the network. Examples of media may include magnetic media such as hard disks, floppy disks and magnetic tapes, optical recording media such as CD-ROMs and DVDs, magneto-optical media such as floppy disks, ROMs, RAMs, flash memories, and the like to store program instructions. Examples of other media include app stores that distribute applications, sites that supply or distribute various software, and recording media or storage media managed by servers.

Although embodiments have been described according to limited embodiments and drawings as above, various modifications and modifications are possible from the above description to those of ordinary skill in the art. For example, even if the described techniques are performed in a different order from the described method, and/or components such as the described system, structure, device, circuit, etc. are combined or combined in a different form from the described method or are substituted or substituted by other components or equivalents, appropriate results may be achieved.

Therefore, other implementations, other embodiments, and equivalents to the claims fall within the scope of the claims to be described later.

What is claimed is:

1. An electronic device provided in an autonomous vehicle, the electronic device comprising:
   a camera;
   a memory storing instructions; and
   at least one processor operatively coupled with the camera;
   wherein the at least one processor is configured to, when the instructions are executed:
   obtain a front image in which the autonomous vehicle is driving through the camera, identify a target vehicle in the front image based on the vehicle detection model stored in the memory, generate a bounding box corresponding to the target vehicle in response to an identification of the target vehicle, generate a sliding window having a height equal to the height of the bounding box and having a width half of the width of the bounding box, divide the bounding box into a first area positioned left based on a middle position of the bounding box, and a second area positioned right based on the middle position of the bounding box, generate an extended bounding box by extending the first area in a left direction and extending the second area in a right direction, wherein size of the extended bounding box is twice as wide as size of the bounding box, wherein pixel values in extended portions of the extended bounding box are corresponding to an average value of all pixel values included in the bounding box, obtain a sum of a pixel difference values between a left portion of the sliding window and a right portion of the sliding window for each shift by sequentially shifting the sliding window by a predefined pixel interval with respect to all of width of the extended bounding box, wherein the right portion of the sliding window is inverted left and right while obtaining the sum of the pixel difference values for each of the sequentially shifted sliding windows, and identify a point that corresponds to a minimum value among sum values respectively indicating the sums that are obtained according to the shifting.

2. The electronic device of claim 1, wherein the at least one processor is configured to, when the instructions are executed:

change each of the pixels of the right portion of the sliding window for inverting the second area left and right, and obtain the sums of the pixel difference values by adding up difference values of each of the pixels of the inverted right portion and each of the pixels of the left portion.

3. The electronic device of claim 1, wherein the at least one processor is configured to, when the instructions are executed:

calculate a difference value between a x-coordinate value of the point where the sum value is minimum and a center x-coordinate value of the front image, identify an occurrence of a cut-in event, in response to identifying that an amount of change in the difference value per unit time exceeds a negative threshold value, perform vehicle control for preventing collision of the autonomous vehicle in response to identifying the occurrence of the cut-in event.

4. The electronic device of claim 1, wherein the at least one processor is configured to, when the instructions are executed:

identify a coordinate of a center point of the bounding box, obtain a first direction based on identifying whether the identified coordinate is included in a left area or a right area in the front image, wherein the sliding window is started the shifting from an edge corresponding to the first direction among four edges forming the bounding box.

5. The electronic device of claim 4, wherein the at least one processor is configured to, when the instructions are executed:

set an area of interest that has a height equal to the height of the bounding box and a width twice as wide as a portion of the bounding box from the point where the sum value is minimum to the edge corresponding to the first direction, based on the point where the sum value is minimum.

6. The electronic device of claim 5, wherein the at least one processor is configured to, when the instructions are executed:

identify a vehicle type of the target vehicle, based on the vehicle detection model, identify a full width value corresponding to the identified vehicle type, calculate a full width value of the target vehicle, based on the width of area of the interest, decide whether a difference of the full width value corresponding to the identified vehicle type and the calculated the full width value of the target vehicle, exceeds a predetermined value, identify that a detection result of the area of interest is not valid when the difference of the full width value corresponding to the identified vehicle type and the calculated the full width value of the target vehicle, exceeds a predetermined value.

7. The electronic device of claim 4, wherein the at least one processor is configured to, when the instructions are executed:

obtain the second direction based on identifying whether the point where the sum value is minimum is included in the left area or the right area within the bounding box, determine that the identification of the point where the sum value is minimum is not valid, when the first direction and the second direction do not match.

8. The electronic device of claim 7, wherein the at least one processor is configured to, when the instructions are executed:

identify whether the point where the sum value is minimum is included within a predetermined area formed along the first direction from a center x-axis of the bounding box, when the first direction and the second direction match, determine that the identification of the point where the sum value is minimum is not valid, when the point where the sum value is minimum is not included within the predetermined area.

9. The electronic device of claim 1, further comprises:

a sensor module for measuring a velocity of the autonomous vehicle;

wherein the at least one processor is configured to, when the instructions are executed:

measure the velocity of the autonomous vehicle through the sensor module, perform a comparison between the measured velocity and a threshold velocity.

10. The electronic device of claim 9, wherein the at least one processor is configured to, when the instructions are executed:

increase the predefined pixel interval when the measured velocity exceeds the threshold velocity.

11. A method of operating an electronic device provide in an autonomous vehicle, obtaining a front image in which the autonomous vehicle is driving through a camera, identifying a target vehicle in the front image based on the vehicle detection model stored in a memory, generating a bounding box corresponding to the target vehicle in response to an identification of the target vehicle, generating a sliding window having a height equal to the height of the bounding box and having a width half of the width of the bounding box, dividing the bounding box into a first area positioned left based on a middle position of the bounding area and a second area positioned right based on the middle position of the bounding area, generating an extended bounding box by extending the first area in a left direction and extending the second area in a right direction wherein size of the extended bounding box is twice as wide as size of the bounding box, wherein pixel values in extended portions of the extended bounding box are corresponding to an average value of all pixel values included in the bounding box, obtaining a sum of a pixel difference values between a left portion of the sliding window and a right portion of the sliding window for each shift by sequentially shifting the sliding window by a predefined pixel interval with respect to all of width of the extended bounding box, wherein the right portion of the sliding window is inverted left and right while obtaining the sum of the pixel difference values for each of the sequentially shifted sliding windows, and identifying a point that corresponds to a minimum value among sum values respectively indicating the sums that are obtained according to the shifting.

12. The method of claim 11, wherein the operation of obtaining the sum of the pixel difference values between the left portion of the sliding window and the right portion of the sliding window further comprises:

changing each of the pixels of the right portion of the sliding window so that the second area is left and right inverted, and obtaining the sums of the pixel difference values by adding up difference values of each of the pixels of the inverted right portion and each of the pixels of the left portion.

13. The method of claim 11, further comprises:

calculating a difference value between a x-coordinate value of the point where the sum value is minimum and a center x-coordinate value of the front image, identifying an occurrence of a cut-in event, in response to identifying that an amount of change in the difference value per unit time exceeds a negative threshold value, performing vehicle control for preventing collision of the autonomous vehicle in response to identifying the occurrence of the cut-in event.

14. The method of claim 11, further comprises:

identifying a coordinate of a center point of the bounding box, obtaining a first direction based on identifying whether the identified coordinate is included in a left area or a right area in the front image, wherein the sliding window is started the shifting from an edge corresponding to the first direction among four edges forming the bounding box.

15. The method of claim 14, further comprises:

setting an area of interest that has a height equal to the height of the bounding box and a width twice as wide as a portion of the bounding box from the point where the sum value is minimum to the edge corresponding to the first direction, based on the point where the sum value is minimum.

16. The method of claim 15, further comprises:

identifying a vehicle type of the target vehicle, based on the vehicle detection model, identifying a full width value corresponding to the identified vehicle type, calculating a full width value of the target vehicle, based on the width of area of the interest, deciding whether a difference of the full width value corresponding to the identified vehicle type and the calculated the full width value of the target vehicle, exceeds a predetermined value, identifying that a detection result of the area of interest is not valid when the difference of the full width value corresponding to the identified vehicle type and the calculated the full width value of the target vehicle, exceeds a predetermined value.

17. The method of claim 14, further comprises:

obtaining the second direction based on identifying whether the point where the sum value is minimum is included in the left area or the right area within the bounding box, determining that the identification of the point where the sum value is minimum is not valid, when the first direction and the second direction do not match.

18. The method of claim 17, further comprises:

identifying whether the point where the sum value is minimum is included within a predetermined area formed along the first direction from a center x-axis of the bounding box, when the first direction and the second direction match, determining that the identification of the point where the sum value is minimum is not valid, when the point where the sum value is minimum is not included within the predetermined area.

19. The method device of claim 11, further comprises:

measuring the velocity of the autonomous vehicle through the sensor module, performing a comparison between the measured velocity and a threshold velocity.

20. The method of claim 19, further comprises:

increasing the predefined pixel interval when the measured velocity exceeds the threshold velocity.

* * * * *